United States Patent

Moses

[15] 3,647,976

[45] Mar. 7, 1972

[54] TIME-SHARING SUBSCRIBER COMMUNICATIONS SYSTEM

[72] Inventor: Donald W. Moses, Robbinsdale, Minn.

[73] Assignee: Minnesota Mining and Manufacturing Company, St. Paul, Minn.

[22] Filed: Mar. 9, 1970

[21] Appl. No.: 17,367

[52] U.S. Cl. ....................179/15 AL, 332/9 T

[51] Int. Cl. ....................H04j 7/00

[58] Field of Search ........179/15 AL, 15 BD, 15 MM, 18 FC; 325/39, 40, 58, 142; 329/106; 332/9, 9 T; 340/150, 183, 184

[56] References Cited

UNITED STATES PATENTS

| | | | |
|---|---|---|---|
| 3,529,089 | 9/1970 | Davis et al. | 179/15 AL |
| 3,483,329 | 12/1969 | Hunkins et al | 179/15 AL |
| 3,519,750 | 7/1970 | Beresin et al. | 179/15 AL |
| 2,907,874 | 10/1959 | Hallorson | 325/5 |
| 3,489,853 | 1/1970 | Lang | 325/40 |
| 2,921,981 | 1/1960 | Kidd | 179/15 BT |
| 2,336,276 | 12/1943 | Van Der Meulen | 179/15 BT |
| 2,471,138 | 5/1949 | Bartelink | 325/39 |

*Primary Examiner*—Kathleen H. Claffy

*Assistant Examiner*—David L. Stewart

*Attorney*—Kinney, Alexander, Sell, Steldt & Delahunt

[57] ABSTRACT

A time-sharing subscriber communications system wherein a time-division multiplexed signal having a series of frames and a predetermined number of time slots in each frame is transmitted in a given frequency band over a single wideband circuit to a plurality of subscriber terminals. Various time slots contain information from various input channels which are respectively related to various ones of the subscriber terminals. The transmitted signal is modulated by a zero axis crossing modulation scheme wherein each time slot is defined by the interval between successive zero axis crossings and the information contained in each time slot is defined by the duration of the time slot. At each subscriber terminal the information related to that channel is tapped off from the signal received from the transmitter terminal, a portion of the received signal is retransmitted over the wideband circuit and new information related to the subscriber terminal is newly transmitted in one or more time slots of each frame of the time-division multiplexed signal. A receiver terminal, interfaced to the opposite end of the wideband circuit from the transmitter terminal, demodulates the newly transmitted information from the subscriber terminal and provides output signals to various output channels respectively related to various ones of the subscriber terminals.

27 Claims, 27 Drawing Figures

Patented March 7, 1972 3,647,976

10 Sheets-Sheet 1

INVENTOR.
DONALD W. MOSES
BY Kinney, Alexander, Sell, Steldt & DeLaHunt
ATTORNEYS INVENTOR.
DONALD W. MOSES
BY Kinney, Alexander,
Sell, Steldt & DeLa Hunt
ATTORNEYS INVENTOR.
DONALD W. MOSES
BY Kinney, Alexander, Sell, Steldt & De La Hunt
ATTORNEYS INVENTOR.
DONALD W. MOSES
BY Kinney, Alexander
Sell, Steldt & De La Hunt
ATTORNEYS INVENTOR.
DONALD W. MOSES
BY Kinney, Alexander,
Sell, Steldt & De La Hunt
ATTORNEYS INVENTOR:
DONALD W. MOSES
BY Kinney, Alexander,
Sell, Steldt & DeLaHunt
ATTORNEYS

Patented March 7, 1972 3,647,976

10 Sheets-Sheet 7

INVENTOR
DONALD W. MOSES
BY Kinney, Alexander, Sell, Steldt & DeLaHunt
ATTORNEYS INVENTOR
DONALD W. MOSES
BY Kinney, Alexander,
Sell, Steldt & De La Hunt
ATTORNEYS INVENTOR.
DONALD W. MOSES
BY Kinney, Alexander, Sell, Steldt & De La Hunt
ATTORNEYS INVENTOR.
DONALD W. MOSES
BY Kinney, Alexander,
Sell, Steldt & DeLaHunt
ATTORNEYS

TIME-SHARING SUBSCRIBER COMMUNICATIONS SYSTEM

BACKGROUND OF THE INVENTION

The present invention generally pertains to time sharing communications systems and more specifically concerns a system wherein a time-division multiplexed signal containing information related to various subscriber terminals in various time slots of each frame is carried over a single wideband circuit connected to the various subscriber terminals.

Typical of a prior art time-division multiplex system is the pulse code modulation (PCM) carrier system such as the system described in the booklet "Pulse Code Modulation in Telephone" by Frank Boxall, which booklet is available from VICOM, 77 Ortega Avenue, Mountain View, Cal. 94040. The subject matter contained in this booklet was also published in a series of three articles in *Telephone Engineer and Management Magazine* in the Sept. 15, 1968 issue at pages 44–48, in the Oct. 15, 1968 issue at pages 46–53, and in the Jan. 1, 1969 issue at pages 28–32. PCM carrier systems, however, are not known to be used in providing subscriber communication service.

In a typical PCM carrier system, a signal containing a plurality of communication channels is transmitted between central exchange offices. This communication signal includes a series of pulses. An analog input signal related to a given communication signal is modulated by being broken down into one of a predetermined number of discrete amplitude levels, such as 128, and then presented to an encoder which converts each discrete amplitude level into a code word consisting of a given number of binary digits, such as 7. Seven code bits can represent any one of $2^7=128$ discrete amplitude levels. Each binary digit corresponds to a pulse in a pulse train and as a result each communication channel of the pulse train takes up the given number of pulses such as 7. After encoding, each word having the given number of bits is augmented with an additional bit for supervisory control purposes, such as a signaling bit for indicating whether a channel is on-hook or off-hook. In other words, the time slot for each communication channel for a signal transmitted over the wideband circuit is of sufficiently long duration to include information in the form of a multiple-bit binary number. The information in a given time slot is retrieved upon receipt at a central exchange office by an inverse process wherein the signaling bit is routed to a channel signaling relay and the multiple-bit code words are applied to a decoder which generates a discrete amplitude level corresponding to the code value. The discrete amplitude level may then be reconstructed to a corresponding voltage amplitude representative of the original analog input signal.

In the PCM carrier system, separate circuits are used in providing transmissions in different directions between the central exchange offices.

There are certain limitations in using a PCM carrier system, such as: (1) the use of several pulses to carry the information in each time slot for each communication channel places a limitation on the information-carrying capacity of the system; and (2) the modulation and demodulation techniques are quite expensive by reason of the complexity of the signal conversion techniques employed.

A typical prior art subscriber communication system is described in the technical manual "S6 Station Carrier Description & Application Manual," which is available from Anaconda Electronics Company, 1430 S. Anaheim Blvd., Anaheim, Calif. 92803. Known subscriber communication systems use frequency multiplexing and provide only about six channels on each single circuit for serving that number of subscriber terminals as a maximum. In the context of the present patent specification, a multiple party network connected to the single circuit through a single one of the six subscriber terminals on the circuit is considered as a single subscriber output system. Thus, if each of the six subscriber terminals has a four-party network connected thereto, the system is, nevertheless, considered as a six subscriber terminal system, although 24 parties are being served.

SUMMARY OF THE INVENTION

The present invention is believed to provide advantages over the PCM carrier system from the standpoint of providing individual subscriber terminal service, and over both the PCM carrier system and the prior art subscriber carrier communications systems from the standpoint of providing increased information-carrying capacity and decreased overall system component complexity and cost. The present invention is a time sharing subscriber communications system wherein a time-division multiplexed signal having a series of frames, and a predetermined number of time slots in each frame and containing information, related to various subscriber terminals in various time slots of each frame, is carried over a single wideband circuit connected to the various subscriber terminals. The subscriber terminals are connected in series in the wideband circuit. A transmitter terminal and a receiver terminal are interfaced at opposite ends of the wideband circuit for transmitting and receiving the time-division multiplexed signal in a given frequency band. At each of the subscriber terminals, demodulating means are provided for tapping off from the time-division multiplexed signal the information in the time slot for that subscriber terminal. Transmitting means are also provided at individual subscriber terminals for retransmitting a portion of the received multiplexed signal and for newly transmitting, in a time slot of the time-division multiplexed signal being transmitted from that subscriber terminal, new information from that subscriber terminal to the receiver terminal. The multiplexed signal received at the receiver terminal over the single wideband circuit thus contains information signals transmitted from and related to the various subscriber terminals.

The time-sharing communications system is characterized by a zero-axis crossing modulation scheme which is a modification and improvement of the pulse width modulation scheme. In the zero-axis crossing modulation scheme, the information is carried by a pulse train signal, the level of which is instantaneously switched between a nominal positive voltage and a nominal negative voltage about a nominal zero axis. The elapsed time between such zero-axis crossings defines the analog value of the signal at an input channel source then being sampled. Each time slot is defined by the interval between successive zero-axis crossings and the information contained in each time slot is defined by the duration of the time slot. A frame is defined as each series of information samples wherein each input channel is sampled once. Within each frame there are a predetermined number of time slots, which number is limited by the band width of the given frequency band on the single wideband circuit. The end of a sync pulse signals the beginning of each frame such that the information corresponding to a particular input channel is always a countable number of zero-axis crossings behind the sync pulse. The demodulation of the received time-division multiplexed signal is accomplished by providing an integrated signal of linearly varying amplitude during the duration of the time slot being received.

In the time sharing subscriber communications system of the present invention, a plurality of subscriber terminals are connected in series in a wideband circuit. A transmitter terminal is connected to a first given number of input channels which are sources of analog input signals such as are present in a central exchange office and interfaced to the wideband circuit for transmission of the time-division multiplexed signal in the given frequency band at one end of the series-connected subscriber terminals. A receiver terminal is connected to a second given number of output channels for carrying analog output signals and interfaced to the wideband circuit for reception of the time-division multiplexed signal in the given frequency band at the opposite end of the series-connected subscriber terminals. The first given number of input channels may be the same as the second given number of output channels, depending upon the requirements of the various subscriber output systems connected to the various subscriber terminals. The transmitter terminal includes a transmitter which transmits on the wideband circuit a time-division multiplexed signal containing information related to various ones of the subscriber terminals in the various time slots of each frame and containing a sync pulse for defining each frame. The transmitter terminal further includes a modulator for modulating the transmitted signal to provide a time-division multiplexed signal containing time slots and for placing in the time slots, in a predetermined order related to the series order of the subscriber terminals, information corresponding to the analog input signals received from various input channels respectively related to various ones of the subscriber terminals.

Each subscriber terminal includes a demodulator for tapping-off from the time-division multiplexed signal received on the wideband circuit the information contained in the time slots related to that subscriber terminal and for providing an analog output signal corresponding to the tapped-off information. Each subscriber terminal further includes a transmitter for retransmitting a portion of the time-division multiplexed signal received on the wideband circuit and for newly transmitting in one or more time slots of each frame information related to that subscriber terminal.

The receiver terminal includes a demodulator for tapping off from a time-division multiplexed signal received on the wideband circuit the information contained in the time slots related to each of the subscriber terminals, and for providing analog output signals corresponding to the tapped-off information to various output channels respectively related to various ones of the subscriber terminals.

During each frame, a transmitter terminal modulator provides to the transmitter terminal transmitter, in the predetermined order related to the series order of the subscriber terminals on the wideband circuit, a series having a predetermined number of pulses corresponding to the predetermined number of time slots wherein the pulses are spaced at intervals corresponding to the values of the received analog input signals. During each frame, the transmitter terminal transmitter transmits on the wideband circuit a time-division multiplexed signal, the level of which is instantaneously switched across a nominal zero axis between a nominal positive value and a nominal negative value in response to each pulse in the train of pulses received from the transmitter terminal modulator.

In one preferred embodiment, the time-division multiplexed signal, which is placed on the wideband circuit at an individual subscriber terminal, contains the information newly transmitted from that subscriber terminal in a time slot or time slots following both those retransmitted time slots containing information for the remaining subscriber terminals on the circuit and those time slots containing information which was newly transmitted from the previous subscriber terminal on the circuit. As a result, the information for the next remaining subscriber terminal occupies the first time slot of the time-division multiplexed signal received at the next remaining subscriber terminal.

Another feature of the present invention is the system of tapping-off the information from the various time slots in such a manner as to have all the subscriber terminals identical. Referring to FIG. 4A, which shows one frame of the signal as received at the first subscriber terminal location, the information corresponding to input channel 1 is tapped off from time slot 1 which is the first time slot following the sync pulse. The pulse train is then inverted, as shown by FIG. 4B. Referring to FIG. 4C, a new sync pulse is generated in such a manner as to create a new time slot at the end of the pulse train containing the information to be transmitted from the first subscriber terminal and corresponding to output channel 1 at the central exchange office receiver terminal. The new sync pulse is extended to the end of received line slot 1. Thus, the information corresponding to input channel 2 contained in time slot 2 occupies the first time slot following the sync pulse in the new pulse train (FIG. 4C) which is then transmitted over the wideband circuit to the next series-connected subscriber terminal. This process of tapping off, inverting and retransmitting is repeated at each subscriber terminal until the pulse train contains only information to be transmitted from the subscriber terminals to the receiver terminal at the central exchange office. Since no information is carried in the signal amplitude, the signal can be completely regenerated at each subscriber terminal location, thus eliminating the need for a large number of pulse regenerators between terminals. Also, since no information is carried in the signal amplitude, degradation of the signal between terminals or regenerators is not critical, so long as the intervals between zero-axis crossings are maintained.

DESCRIPTION OF THE PREFERRED EMBODIMENTS

The time-sharing subscriber communications system of the present invention may be used to simultaneously provide telephone service to a plurality of time sharing subscribers along its route.

Figure 1:
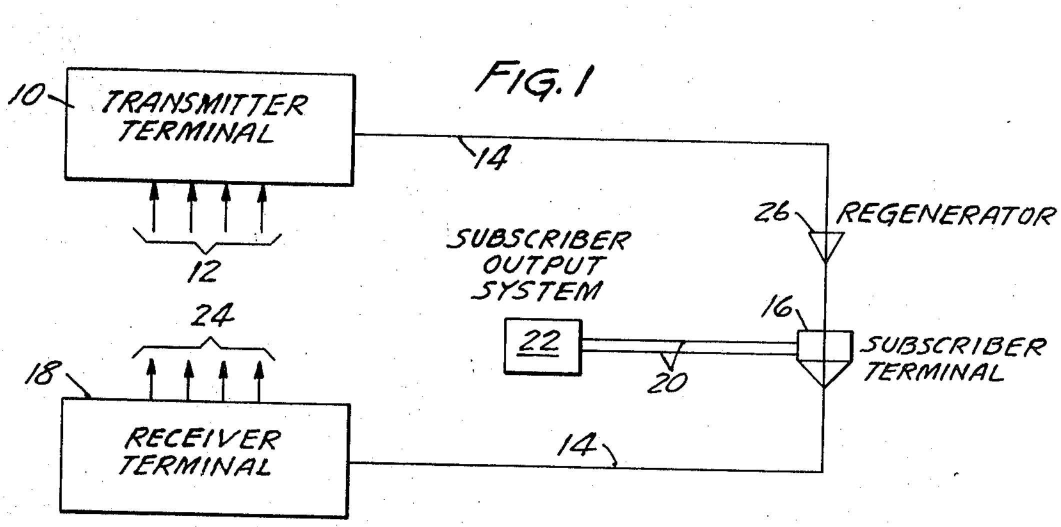
FIG. 1 is a simplified block diagram illustrating the concept of the time sharing subscriber communications system of the present invention.

Referring first to FIG. 1, the transmitter terminal 10, in response to the signals received on a first given number of input channels 12, transmits a time-division multiplexed signal over a single wideband circuit 14, such as may be provided by a coaxial cable. This signal is received at the subscriber terminal 16 which is one of a plurality of subscriber terminals connected in series along the wideband circuit between the transmitter terminal 10 and the receiver terminal 18.

At each subscriber terminal 16, the information contained in the time-division multiplexed signal, which relates to that subscriber terminal 16, is tapped off and provided on the lines 20 to the subscriber output system 22. The subscriber output system 22 may be a telephone set, a computer, a similar type of output device or a plurality or combination thereof.

Information provided from the subscriber output system 22 is furnished on the lines 20 to the subscriber terminal 16. The subscriber terminal 16 retransmits a portion of the signal received on the wideband circuit 14 and also transmits new information provided on the lines 20 from the subscriber output device 22. The time-division multiplexed signal transmitted from the subscriber terminal 16 is transmitted to the next subscriber terminal on the circuit 14 where the tapping-off and retransmitting and transmitting processes are repeated.

Eventually, the time-division multiplexed signal which is received at the receiver terminal 18 contains only information transmitted from the various subscriber terminals 16. At the receiver terminal 18, the information contained in the time-division multiplexed signal is received, tapped off, demodulated, and provided to a second given number of output channels 24, which are related to the subscriber terminals 16 on the wideband circuit 14.

Pulse regenerators 26 are also connected in series in the wideband circuit 14 as required, when the distance between terminals 10, 16, 18 is sufficiently great, that the time-division multiplexed signal transmitted from the previous terminal on the circuit 14 would otherwise be materially degraded.

The use of coaxial cable tends to eliminate jitter interference and thereby also tends to eliminate the problem of changes in the intervals between zero-axis crossings during the course of signal transmission. The connection from the subscriber terminal 16 to a subscriber output system 22, such as a telephone set, is equivalent to the connection between the line tap unit and the telephone set in the prior art subscriber carrier system presently available for six-channel operation.

Figure 2:
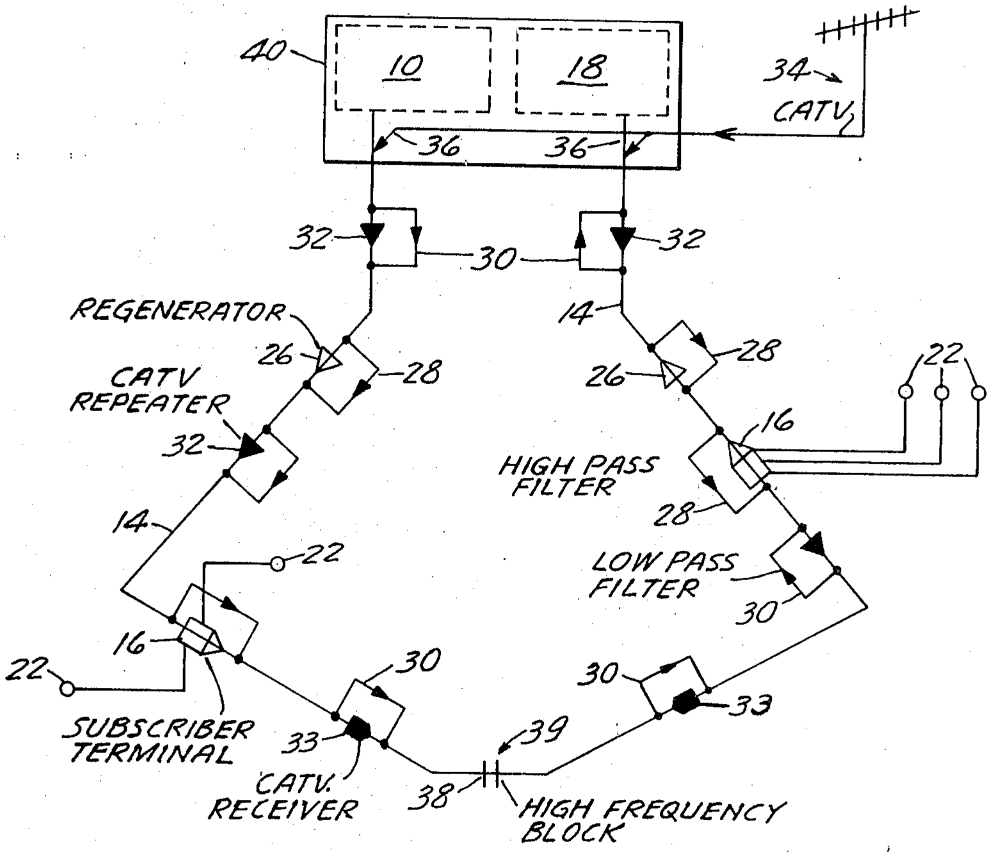
FIG. 2 is a simplified block diagram illustrating a "closed-loop" time-sharing subscriber communications system in accordance with the present invention, wherein telephone services and cable TV services are provided over the same physical circuit.

The system of the present invention may be a closed loop system as illustrated by FIG. 2, wherein both the transmitter terminal 10 and the receiver terminal 18 are located at and interfaced with the wideband circuit at the central exchange office. Alternatively, the system of the present invention may be a nonclosed-loop system as illustrated in FIG. 3, wherein the receiver terminal 18 is located at and interfaced with the wideband circuit at the central exchange office; and the transmitter terminal 10, although also located at the central exchange office, is interfaced through a frequency multiplex system to the wideband circuit at a remote location.

Referring to the closed loop system of FIG. 2, telephone service is provided in a relatively low frequency band over the same wideband circuit 14, such as a coaxial cable, which is used for transmitting other services, such as cable TV (CATV). A single low frequency band, such as from 1 to 50 megahertz, is reserved for the telephone service so as not to interfere with or to be interfered with by the other transmitted services. High-pass filters 28 are coupled around the telephone service pulse regenerators 26 and subscriber terminals 16; and low-pass filters 30 are coupled around the CATV repeaters 32 and CATV receivers 33 in order to prevent degradation of either type of service by reason of the connection to the circuit 14 of equipment necessary for providing the other type of service. It is noted that while the telephone services are provided in only one direction from the transmitter terminal 10 around the circuit 14 to the receiver terminal 18, the CATV services from the CATV headend 34 are transmitted over the circuit 14 by coupling onto the circuit 14 through directional couplers 36 which are connected to the circuit 14 at both the transmitter terminal end and the receiver terminal end of the circuit 14. A high-frequency block 38 is provided in the circuit at a location 39 remote from the central exchange office 40 to prevent the CATV service from interfering with itself. The high frequency block 38 passes the lower frequencies used for the telephone services so that the telephone services may nevertheless be transmitted through this remote location 39.

Figure 3A:
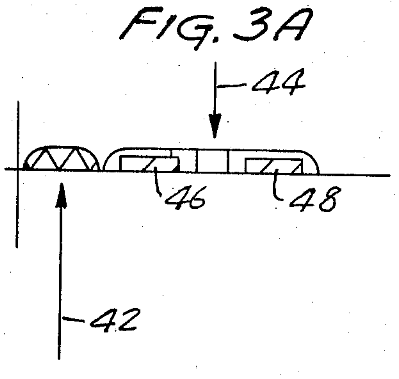
FIG. 3A is a graphical representation of the frequency allocation characteristics of the "nonclosed-loop" time-sharing subscriber communications system of FIG. 3.
Figure 3:
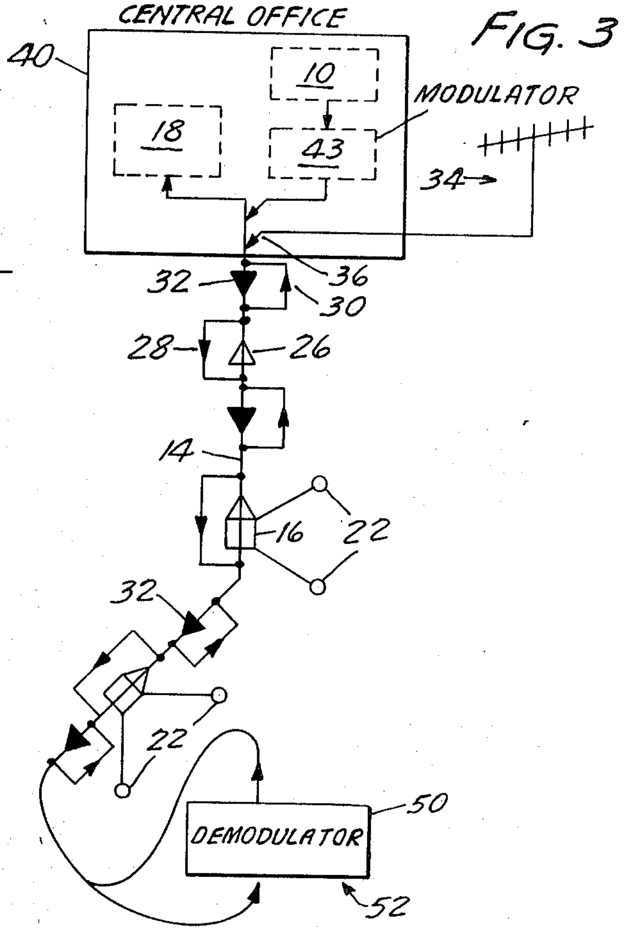
FIG. 3 is a simplified block diagram illustrating a "nonclosed-loop" time-sharing subscriber communications system in accordance with the present invention, wherein telephone services and cable TV services are provided over the same physical circuit.

Referring to the nonclosed-loop system of FIG. 3, wherein telephone services and CATV are again provided over the same wideband circuit 14, a time-division multiplexed signal for providing telephone services is transmitted over the wideband circuit 14 in a low-frequency band 42 (FIG. 3A) to the subscriber terminals 16 and eventually to the receiver terminal 18 at the central exchange office 40. First, however, the time-division multiplexed signal transmitted from the transmitter terminal 10, which is located at the central exchange office 40, is frequency translated by a modulator 43 and then carried over the wideband circuit 14 by a frequency multiplexed system in a high-frequency band 44, such as from 108 to 174 megahertz, which is between two TV channels 46 and 48, such as TV channels 6 and 7, from the modulator 43 at the central exchange office 40 location to a demodulator 50 at a remote location 52, from whence it is provided over the low-frequency band 42 to the subscriber terminals 16, and thence to the receiver terminal 18 at the central exchange office 40. The high-frequency band 44, which carries the transmitted time-division multiplexed signal to the remote location 52, is amplified by each CATV repeater 32 so as to prevent degradation between the modulator 43 and the demodulator 50.

In the time sharing scheme of the present invention, time sharing is accomplished by sampling each input channel, such as a telephone channel, at a minimum rate such as 10,000 times per second. If there are a given number of telephone channels on the system, such as 999, there will be that given number (999) of signal amplitude levels which must be sampled in accordance with the minimum rate (in this case, each is sampled every one ten-thousandth of a second).

In the embodiment shown by FIGS. 4A to 22 of the Drawing, information is tapped off from the various time slots in such a manner as to have all the subscriber terminals identical.

Figure 4A:
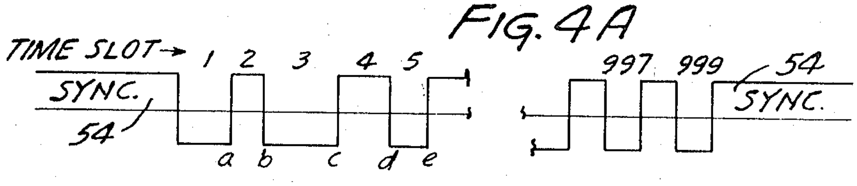
FIGS. 4A, 4B and 4C illustrate the zero axis crossing modulation scheme used with the time sharing subscriber communications system illustrated in FIGS. 1–3.
Figure 7:
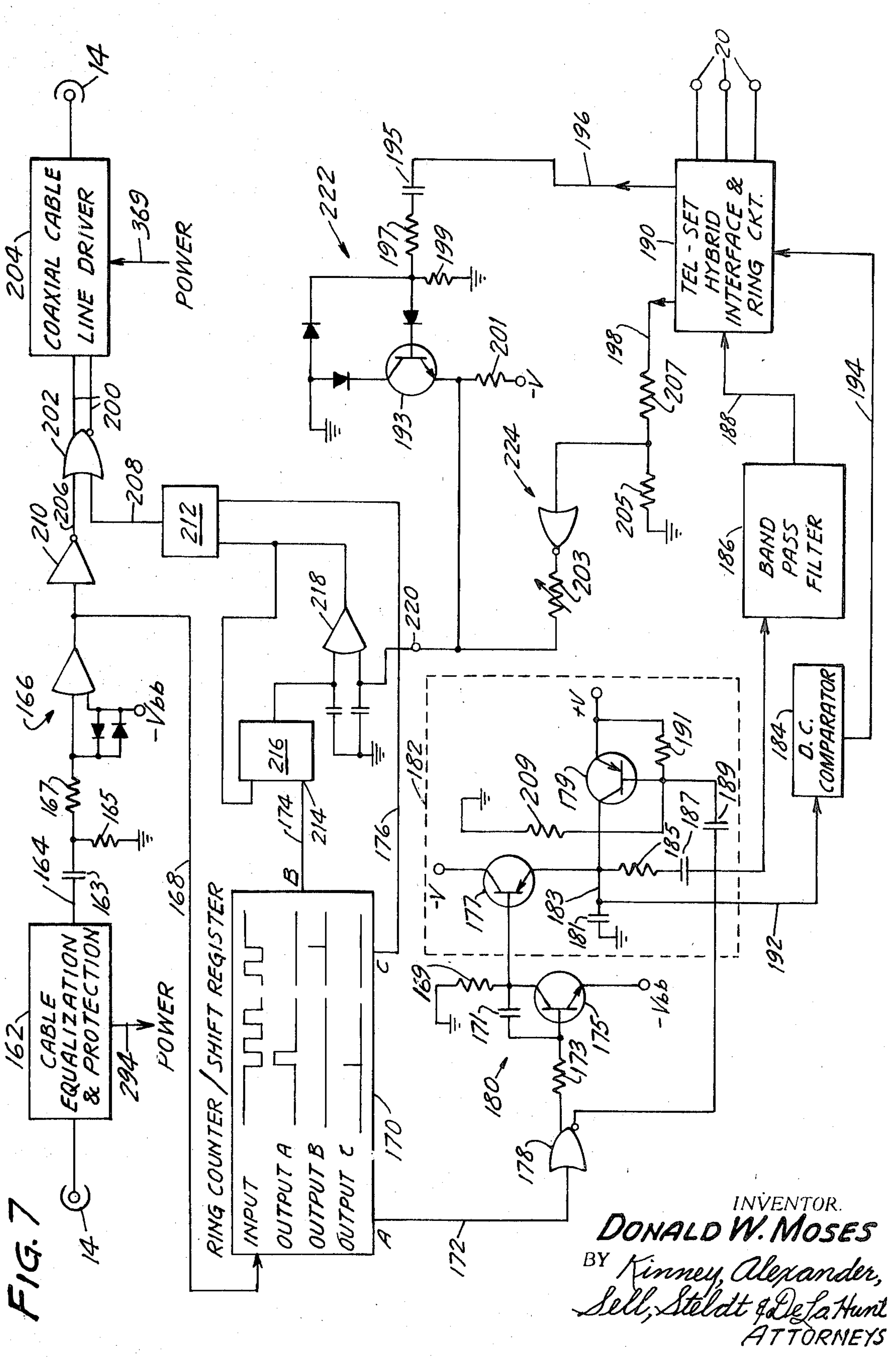
FIG. 7 is a combined block, logic, and schematic circuit diagram of a subscriber terminal shown in FIGS. 1–3.

The waveform of FIG. 4A represents the pulse train of a single frame as transmitted from the transmitter terminal 10 via the wideband circuit 14 to the first subscriber terminal 16. Upon receipt of the signal, information is extracted from the first time slot following the sync pulse 54, using an integrate, sample, hold, and reset technique to demodulate the information contained in the first time slot and to provide an analog signal corresponding thereto. This technique will be described hereinafter in connection with the description of the subscriber terminal as shown in FIG. 7. In other embodiments, information contained in time slots other than or in addition to the information carried in the first time slot may be tapped off from the time-division multiplexed signal received at each subscriber terminal.

Figure 4B:
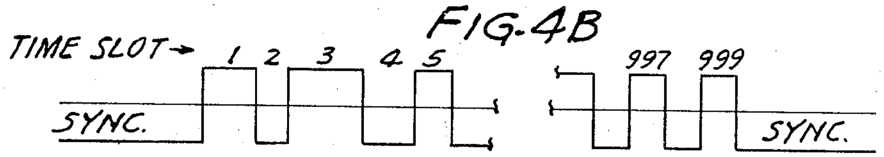
Figure 4C:
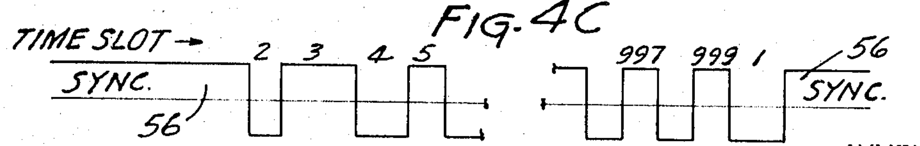

Referring to FIG. 4B, the pulse train is inverted at each location prior to retransmission in order to compensate for the rise and fall time distortion. The waveform of FIG. 4C represents the pulse train of the frame as it is transmitted from the subscriber terminal 16. A new sync pulse 56 now ends at the transition between original time slots 1 and 2 such that original time slot 2 now occupies the first time slot following the sync pulse 56 of the newly transmitted signal. New information related to the subscriber terminal 16 is newly transmitted from the subscriber terminal 16. The new information is included in a time slot number 1, following the last time slot numbered 999 of the original transmitted signal, and preceding the new sync pulse 56, which defines the end of the present frame and the beginning of the next frame. The new information is placed in the new time slot 1 by a process wherein a ring counter/shift register in the subscriber terminal 16 counts the number of pulses received at the subscriber terminal 16. After the ring counter/shift register counts 999, the new information that is to be transmitted to the receiver terminal 18 is sampled to provide the new time slot 1. This sampled information determines the duration of the new time slot 1 and thus determines when the new sync pulse 56 will begin. The waveform of FIG. 4C is then transmitted by the subscriber terminal 16 over the wideband circuit 14 to the next subscriber terminal.

Figure 5:
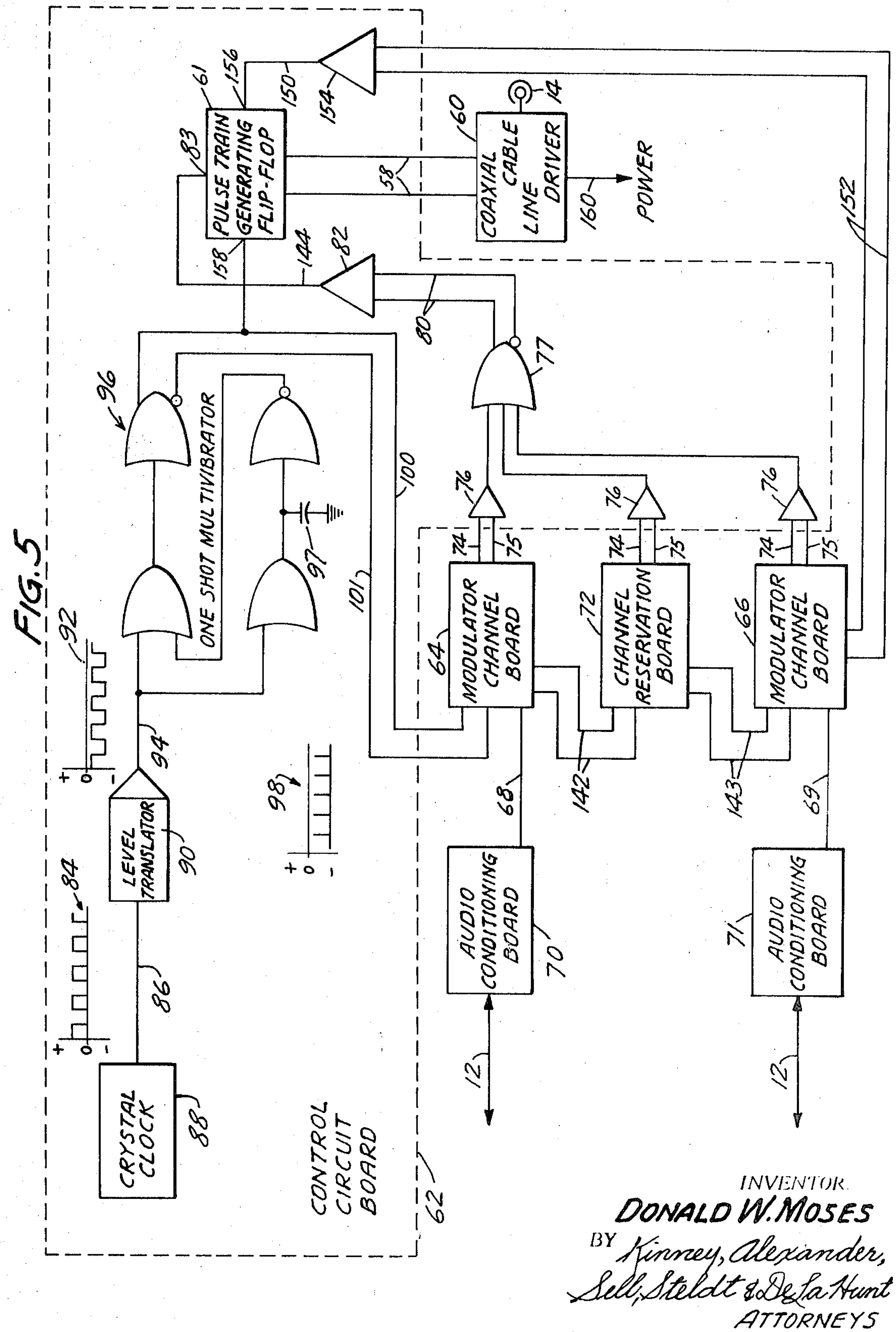
FIG. 5 is a combined block and logic circuit diagram of the transmitter terminal shown in FIGS. 1–3.

The construction and operation of the transmitter terminal 10, the subscriber terminals 16, and the receiver terminal 18 will now be discussed in greater detail. Referring first to the transmitter terminal which is shown in FIG. 5, the analog input signals are received on the input channels 12. The time-division multiplexed signal is furnished on the lines 58 through a coaxial cable line driver 60 to the wideband circuit 14, such as the coaxial cable 14. The transmitter portion of the transmitter terminal includes a pulse train generating flip-flop 61 which is mounted on a control circuit board 62. The modulator portion of the transmitter terminal includes a number of modulator channel boards 64 and 66 which provide signals to the pulse train generating flip-flop 61 for producing the time slots in the time-division multiplexed signal. All of the modulator channels provided by the modulator channel boards are coupled to each other in tandem for serial operation in a predetermined order related to the serial order of the subscriber terminals. The durations of the time slots correspond to the analog signals received on the lines 68 and 69 from the audio conditioning boards 70 and 71 respectively from the input channels 12.

There may be a plurality of modulator channel boards 64 and corresponding input lines 68. Each of the modulator channel boards 64 and the corresponding input lines 68 has a 10-channel capacity.

Channel reservation boards 72 are included among the modulator channel boards 64 and 66 in appropriate locations in order to provide for further expansion of the system. The channel reservation boards are used when the predetermined number of time slots in each frame of the time-division multiplexed signal exceeds the number of input channels by a given number. The channel reservation boards are connected in tandem with the tandem connected modulator channels and between the first and last modulator channel boards 64 and 66. The channel reservation boards 72 provide signals to the pulse train generating flip-flop 61 for producing the given number of time slots, in the time-division multiplexed signal. The duration of each of the given number of time slots is of some predetermined relatively short minimum interval. In other words, each of the given number of pulses is provided at a predetermined minimum interval following the preceding pulse delivered to the OR-gate 77. The time slots which do not relate to any of the various input channels are said to relate to nonworking channels. Each channel reservation board 72 has a 10 nonworking channel capacity.

In an exemplary embodiment, wherein the transmitter terminal is connected to 399 input channels 12, 39 of the modulator channel boards 64, each having a 10-channel capacity, and one last modulator channel board 66 having nine channels are combined with 60-channel reservation boards 72 to provide the 999 time slots of the time-division multiplexed signal. All of the output lines 74 and 75 from each of modulator channel boards 64, from the one last modulator channel board 66, and from each of the channel reservation boards 72 are provided through line receivers 76 to a differential output OR-gate 77. The outputs of the differential output OR-gate 77 are connected by the lines 80 to the line receiver 82 and the output of the line receiver 82 is connected to the toggle input 83 of the pulse train generating flip-flop 61. The outputs for all ten channels of a modulator channel board 64 or of a channel reservation board 72 are all provided on a single pair of output lines 74 and 75 from each board. Likewise, the outputs for all nine channels of the last modulator channel board 66 are provided on a single pair of output lines 74 and 75.

Now describing the operation of the transmitter terminal, a clocking signal having a predetermined frequency, such as a 10 kilohertz clock pulse waveform 84, is provided on a line 86 from a clocking signal generator 88, such as a 10 kilohertz crystal clock 88, to a level translator 90, from which a negatively biased waveform 92 is provided on a line 94 to a one-shot multivibrator 96. A waveform 98, consisting of framing pulses provided at the predetermined frequency, such as the 10-kilohertz rate, is provided on a line 100 from the one-shot multivibrator 96. While a sampling rate of 10 kilohertz is used in this preferred embodiment, other sampling rates may also be appropriate, in which case a crystal clock 88 providing a signal at some other appropriate frequency would be used.

The logic level of the framing pulse waveform on the line 100 is opposite from the logic level of the framing pulse waveform on the line 101. The framing pulse waveforms on these two lines 100 and 101 are conveyed to the modulator channel board 64 which is diagrammatically shown in FIG. 6.

Figure 6:
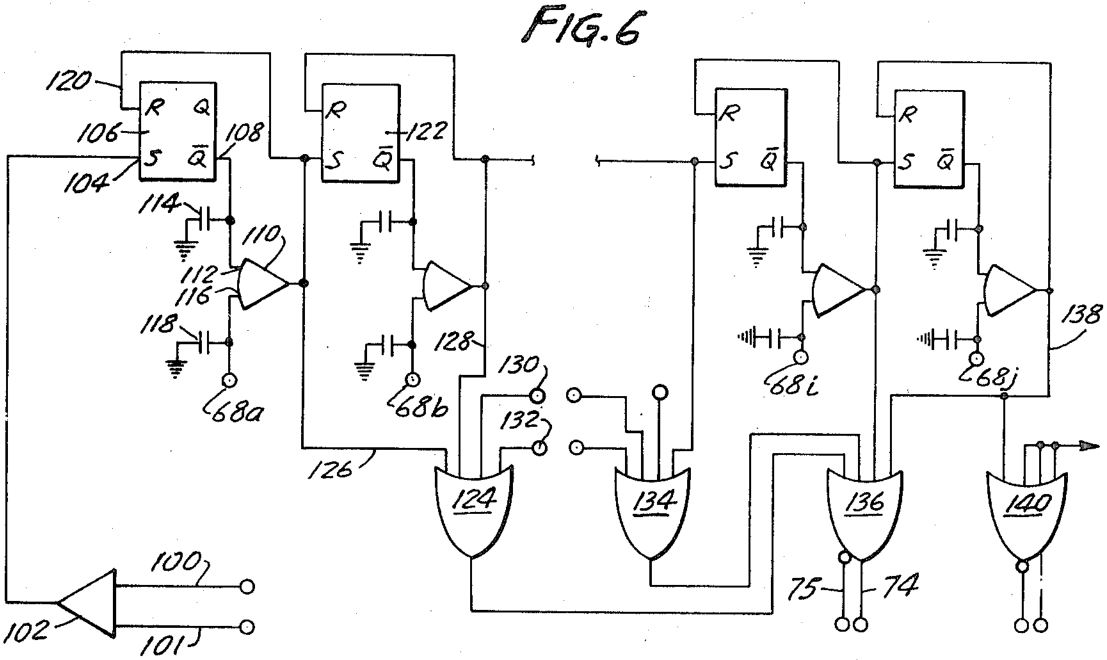
FIG. 6 is a combined logic and schematic circuit diagram of a modulator channel board included in the transmitter terminal of FIG. 5.

Referring now to FIG. 6, the framing pulse waveforms are received on the lines 100 and 101 by the line receiver 102 from which a logic 1 signal is provided to the set input 104 of the first modulator channel flip-flop 106 in response to each framing pulse. The analog input signals provided on the 10 channels 68 from the audio conditioning board 70 are provided to the terminals **68*a*, 68*b*, ..., 68*i* and 68*j*, respectively. The circuitry corresponding to the middle six modulator channels of the modulator board 64 are omitted from FIG. 6. It is seen that upon the receipt of a logic 1 framing pulse to the set input 104 of the flip-flop 106, the logic 0 output is delivered from the $\overline{Q}$ output 108 of the flip-flop 106 which in turn causes a logic 1 signal to be delivered from the output of a paired operational amplifier 110. The first modulator channel includes the paired flip-flop 106 and operational amplifier 110. The logic 1 output from the output of the paired operational amplifier 110 is not immediately delivered, however, but is delayed until the amplitude of the signal at the first input 112 of the operational amplifier, which is itself delayed by a capacitor 114, falls below the amplitude of the signal provided at the second input 116 of the operational amplifier 110 from the terminal 68*a* containing the sampled analog signal. Capacitor 118 is a noise filter. The logic 1 signal delivered from the output of the operational amplifier 110 is received at the reset input 120 of the flip-flop 106, at the set input of the second modulator channel flip-flop 122, and at an input of the OR-gate 124. The logic 1 pulse received at the reset input 120 of the first modulator channel flip-flop 106 causes a logic 1 signal to be delivered from the $\overline{Q}$ output 108 to the first input 112 of the operational amplifier 110 and thus terminates the logic 1 output signal from the operational amplifier 110 as a short duration pulse. The logic 1 pulse received at the set input of the second modulator channel flip-flop 122 initiates the sampling of the analog signal from the terminal 68*b*. This procedure is successively repeated at each modulator channel flip-flop and operational amplifier pair of the modulator channel board 64, with the durations between the delivery of logic 1 pulses on the respective lines 126, 128, 130 and 132 to the OR-gate 124 corresponding to the respective amplitudes of the analog signals being received at the terminals 68*a*, 68*b*, 68*c* and 68*d*. It is seen that the output of the OR-gate 124, which receives signals corresponding to the analog information from the first four channels, and the output of an OR-gate 134, which receives signals on the lines corresponding to the analog information from the second four channels, are connected to the inputs of an OR-gate 136, which also receives similar signals corresponding to the analog information on the last two channels. The outputs from the OR-gate 136 are provided on lines 74 and 75 to a line receiver 76 of the control circuit board 62. The output signal on a line 138 from the output of the operational amplifier for the last channel of the modulator channel board 64 is provided to an OR-gate 140 from which it is delivered to a next tandem coupled modulator channel board or, in those cases wherein the next ten channels in the series of 999 channels are not used, on the lines 142 to a channel reservation board 72**.

Again referring to FIG. 5, the line receiver 82 provides on the line 144 a series of pulses which are provided at intervals corresponding to the amplitudes of the analog signals sampled from the input channels 68 and 69. This signal is provided to the toggle input 83 of the pulse train generating flip-flop 61. The flip-flop 61 is set in response to the signal on the line 150 indicating the last pulse from the last modulator channel board 66 and also thereby indicating the end of the last pulse of the frame. This last pulse signal on the lines 152 is provided through the line receiver 154 onto the line 150, and to the Set terminal 156 of the pulse train generating flip-flop 61 to initiate the beginning of each sync pulse. The end of each sync pulse and the beginning of the first time slot is initiated each time a framing pulse is received at the Reset input 158 of the pulse train generating flip-flop 61 on the line 100 from the one-shot multivibrator 96. Each pulse received at the toggle input 83 of the pulse train generating flip-flop 61 causes alternate logic 0 and logic 1 pulses to be delivered on the Q and $\overline{Q}$ output lines 58 from the pulse train generating flip-flop 61 to the coaxial cable line driver 60, thereby producing a waveform on the coaxial cable such as the waveform of FIG. 4A. Power which is fed over the coaxial cable 14 to operate the subscriber terminals 16 and regenerators 26 applied on line 160 through the coaxial cable line driver 60.

Referring to FIG. 7, wherein the subscriber terminal 16 is shown diagrammatically, a time-division multiplexed signal is received from the wideband circuit 14 through a cable equalization and protection circuit 162 onto a line 164. The cable equalization and protection circuit 162 couples the subscriber terminal unit to the coaxial cable 14. The signal on the line 164 from the cable equalization and protection circuit 162 is fed through a comparator 166 wherein the signal is shaped. For purposes of demodulation, the received time-division multiplexed signal is first fed over a line 168 from the comparator 166 to a ring counter/shift register circuit 170. In the block designating the ring counter/shift register circuit 170, the waveform of the input signal received on the line 168 is shown, as are the waveforms which are furnished at outputs A, B and C onto lines 172, 174 and 176, respectively. The information contained in the first time slot is provided at output A onto the line 172 on which it is fed through the differential output gate 178 to an integrating circuit 180 and a sample, hold, and reset circuit 182 and then through a DC comparator 184 and/or a band pass filter 186, such as an operational amplifier Chebychev filter circuit. An analog output signal such as a telephone audio output signal is provided on the line 188 from the band pass filter 186 to a subscriber output system interface circuit 190, such as a telephone set hybrid interface and ringing circuit 190, and then on to the lines 20 to the subscriber output system 22, such as a telephone set. A supervisory signal portion of the signal furnished from the output 183 of the sample, hold, and reset circuit 182 is provided on a line 192 to a DC comparator circuit 184. When a supervisory signal portion is detected by the DC comparator circuit 184, a supervisory signal is delivered to line 194 into the telephone set hybrid interface and ringing circuit 190. The DC comparator circuit 184 provides a supervisory signal, enabling supervisory functions, such as the ringing of a telephone.

The transmitting portion of the subscriber terminal (FIG. 7) receives an analog audio input signal on the line 196 through the telephone set hybrid interface and ringing circuit 190 from the lines 20 and a supervisory signal on the line 198 from the lines 20, also through the telephone set hybrid interface and ringing circuit 190.

The time-division multiplexed signal transmitted from the subscriber terminal is provided on the output lines 200 of the OR-gate 202 through the coaxial line driver 204 onto the wideband circuit 14. Inputs to the OR-gate 202 are received on the line 206 from the inverter 210, which is connected to the output of the comparator 166, and on the line 208 from a transmitter flip-flop 212. The time-division multiplexed signal as shaped by the comparator 166 is inverted by the inverter 210 and fed on the line 206 to an input of the OR-gate 202.

Simultaneously with the beginning of the first time slot of the inverted signal on the line 206, the pulse delivered from the output C on the line 176 to the Reset input of the flip-flop 212 causes a logic 0 output to be provided from the Q output of the flip-flop 212 on line 208 to an input of the OR-gate 202, thus cancelling out the first time slot of the inverted signal on line 206 and thereby providing a sync pulse 56 which continues until the end of the received first time slot. Thereafter, that portion of the received time-division multiplexed signal following the received first time slot which was not tapped off at the subscriber terminal is fed undisturbed through the OR-gate 202 through the coaxial line driver 204 and onto the wideband circuit 14.

At the conclusion of the last time slot of the received input signal on line 168, a pulse is delivered from the output B via line 174 to the Set input 214 of the flip-flop 216. Paired flip-flop 216 and operational amplifier 218 constitute a subscriber terminal transmitter modulator channel. The paired flip-flop 216 and the operational amplifier 218 operate in response to the analog signal received at the second input 220 of the operational amplifier 218 to provide a logic 1 output pulse from the output of the operational amplifier 218, in the same manner as do the paired flip-flop 106 and operational amplifier 110 of the modulator channel board 64 operate, in response to an analog input signal received at the terminal **68*a*, to provide a logic 1 output pulse from the output of the operational amplifier 110. The logic 1 output pulse from the operational amplifier 218 causes a logic 1 signal to be delivered from the Q output of the transmitter flip-flop 212 on the line 208 to an input of the OR-gate 202. The delivery of the logic 1 signal from the Q output of the transmitter flip-flop 212 initiates the beginning of the sync pulse 56, the end of which sync pulse 56** defines the beginning of the next frame.

The duration of this last time slot, into which information newly transmitted from the subscriber terminal is placed, corresponds to the amplitude of the analog signal provided at the second input 220 of the operational amplifier 218. The amplitude of the analog signal provided at the second input 220 is responsive to the audio input signal from the line 196 and the supervisory signal from the line 198. The audio input signal from line 196 is fed through voltage translator circuit 222 wherein it is biased about a predetermined voltage level and clipped so as not to exceed the predetermined voltage level in either direction by more than a given amount. The supervisory signal from the line 198 is similarly biased and clipped by the voltage translator circuit 224.

The cable equalization and protection circuit 162 (FIG. 15), the coaxial line driver 204 (FIG. 17), the counter/shift register circuit 170 (FIG. 19), the telephone set hybrid interface and ring circuit 190 (FIG. 20) and the DC comparator circuit 184 (FIG. 16) will be discussed in greater detail hereinafter.

Figure 8:
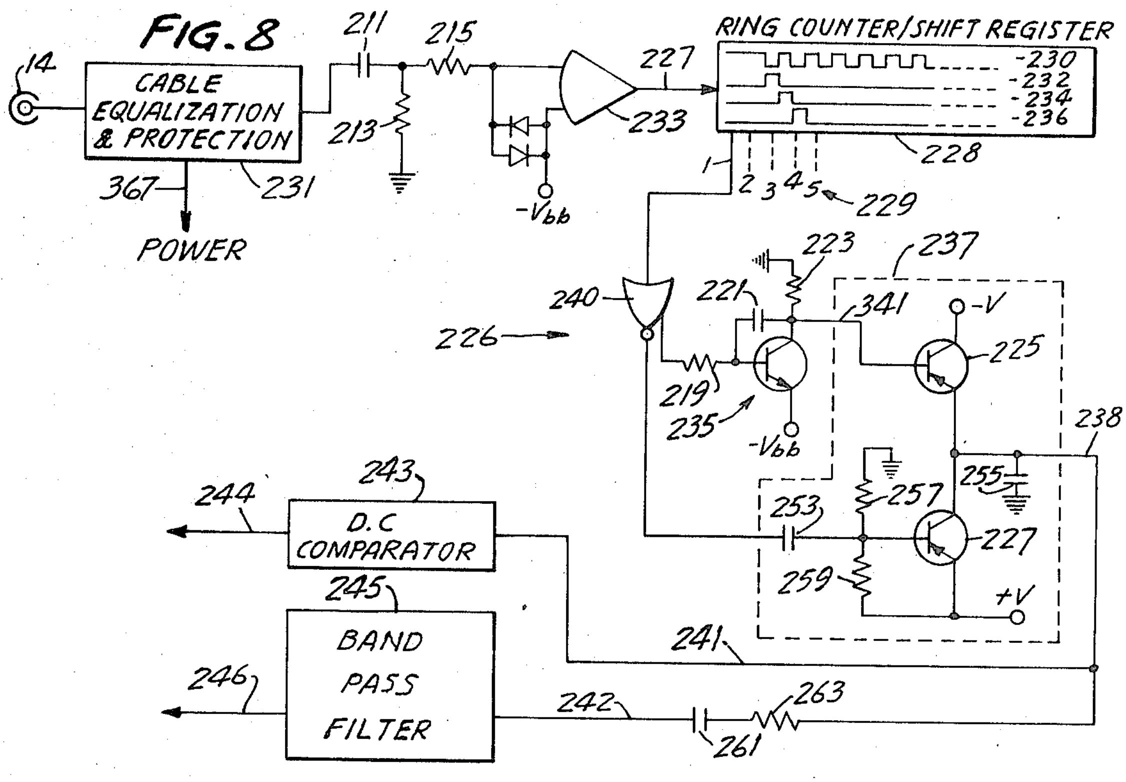
FIG. 8 is a combined block, logic, and schematic circuit diagram of the receiver terminal shown in FIGS. 1–3.
Figure 18:
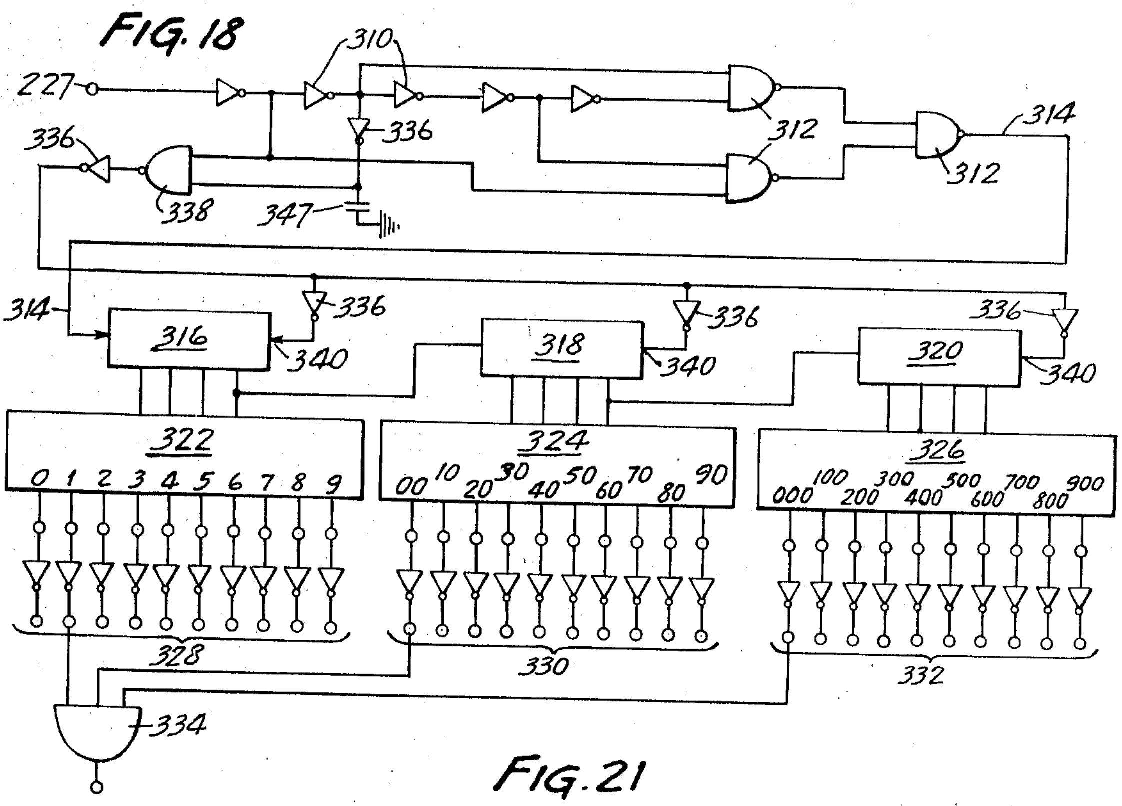
FIG. 18 is a combined block and logic circuit diagram of the ring counter/shift register included in the receiver terminal of FIG. 8.

The receiver terminal, which is diagrammatically shown in FIG. 8, will now be discussed. The receiver terminal includes a group of demodulator circuits 226, one for each output channel 229, all of which operate in a manner similar to the demodulator portion of the subscriber terminal discussed in connection with FIG. 7. The time-division multiplexed signal is received from the wideband circuit 14 by a cable equalization and protection circuit 231 which couples the receiver terminal to the coaxial cable 14. This signal is then fed through a comparator circuit 233 where it is shaped and fed into a ring counter/shift register circuit 228. The ring counter/shift register circuit has a given number of output channels 229, related to the various subscriber terminals 16, in this case 999 output channels. The demodulator circuit 226 for the output channel 1 is shown in FIG. 8. The ring counter/shift register circuit 228, the operation of which will be described in greater detail hereinafter in connection with the description of FIG. 18, provides, in relation to the input signal 230 shown in the 228, the output waveforms 232, 234 and 236, also shown in the block 228, onto the output channels 1, 2 and 3, respectively. As in the case of the subscriber terminal demodulator circuit, 170, 180 and 182, the integrating circuit 235 and the sample, hole, and reset circuit 237 provide on the line 238 a signal having an amplitude which is responsive to the duration of the pulse received by the differential output gate 240 on the input line 1 from the ring counter/shift register circuit 228. This analog signal is fed on the line 241 through the DC comparator circuit 243 to the line 244 for providing a supervisory signal, and on the line 242 through the band pass filter 245 to the line 246 for providing an audio signal output. Lines 244 and 246 are connected to an interface board which is described in detail in connection with FIG. 10. Each output channel 24 includes a supervisory signal output line 244 and an audio signal output line 246.

The audio conditioning boards 70 or 71 (FIG. 9) of the transmitter terminal (FIG. 5) will first be described. Each audio conditioning board has 10 audio input lines such as input line 12*a*, and 10 supervisory input lines, such as line 12as. A power supply for the audio conditioning board is provided at input terminal 248. A power-regulating circuit 247, connected to input terminal 248, provides a negative voltage source, −V. An analog signal is provided at terminal 68a from the voltage translator circuits 249 and 251. The audio input signal received on audio input line 12a is fed through the voltage translator 249 wherein it is biased about a predetermined voltage level and clipped so as not to exceed the predetermined voltage level by more than a given amount. The supervisory signal from the supervisory signal input line 12as is similarly biased and clipped by the voltage translator circuit 251.

Figure 9:
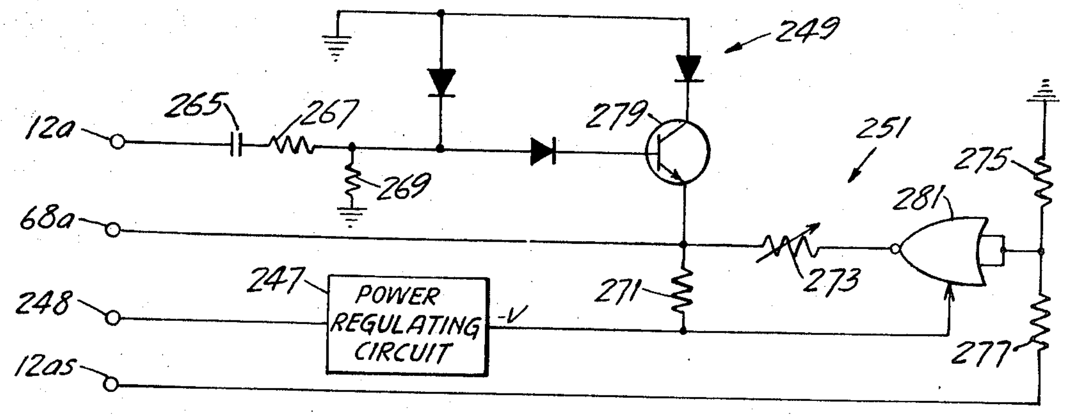
FIG. 9 is a schematic circuit diagram of an audio conditioning board included in the transmitter terminal of FIG. 5.

The interface board (FIG. 10) is used to couple both the transmitter terminal (FIG. 5) and the receiver terminal (FIG. 8) to the terminals of a central exchange office which are used to receive a pair of communication lines, such as a telephone line pair 250 and 252. In the embodiment shown in FIG. 10, the "tip" telephone line is line 250 and the "ring" telephone line is line 252. When a supervisory ringing signal is received on the telephone lines 250 and 252, the ringing detector 254 provides a logic 1 signal on the line 256 to the OR-gate 258 and then through the conditioning circuit 260 to the supervisory signal input line 12as of the audio conditioning board (FIG. 9). When the ringing signal is received at the appropriate subscriber output system 22 and acknowledged so as to provide an off-hook supervisory signal over the wideband circuit 14 to the receiver terminal 18, this off-hook supervisory signal provides a logic 1 signal on the supervisory signal output line 244 from the receiver terminal 18. The logic 1 signal on the supervisory signal output line 244 causes the relay driver 262 to operate the relay 264 to close the contact 266 to enable transmission from the telephone lines 250 and 252 through the operational amplifier hybrid network 268 via the audio signal input line 12*a* to the audio conditioning board 70. When the contact 266 closes, the ringing signal from the telephone lines 250 and 252 is terminated because the DC current path through the operational amplifier hybrid network 268 is completed.

When dialing supervisory signal is received on the supervisory signal output line 244, it is only after an off-hook signal has already been received on the supervisory signal output line 244; in which case a logic 1 supervisory signal indicating a ringing signal has already been provided on the supervisory signal input line 12*as* to the audio conditioning board in response to which an off-hook supervisory signal was delivered to the relay driver circuit 262 to close the contact 266. Thus, as each dial pulse of the dialing supervisory signal is received on the supervisory signal output line 244, the contact 266 is accordingly opened and closed. A delay circuit 270 provides a sufficiently long delay to prevent the logic 1 supervisory signal on the supervisory signal input line 12*as* from being disturbed during the dialing operation.

An audio output signal received at the audio signal output line 246 from the receiver terminal 18 is fed through the operational hybrid network 268 onto the telephone lines 250 and 252. The operation of the operational amplifier hybrid network 268 will now be described with reference to FIG. 11. The transmitted audio signal provided on the lines 250 and 252 appears on audio signal input line 12*a* which is connected to the output of the operational amplifier circuit 272. The audio output signal received from the receiver terminal 18 on the audio signal output line 246 appears at terminal 247 and is fed to a first input of the operational amplifier 278. The signal at terminal 274 is inverted at the output of operational amplifier circuit 278. Thus, the signal appearing at the terminal 276 represents a summation of the audio signals appearing at the output of operational amplifier 278 and on the audio signal from the telephone lines 250 and 252. The signal appearing at terminal 276 and the signal appearing at 274 are additively fed into a first input of the operational amplifier circuit 272 to assure that only the audio input signal being fed into the operational amplifier hybrid network from the telephone lines 250 and 252 is transmitted to the audio conditioning board on the audio input signal line 12*a*. The zener diode 280 protects the operational amplifier hybrid network from the high ringing voltage provided from the telephone lines 250 and 252 to the ringing detector circuit 254 in FIG. 10.

Figure 10:
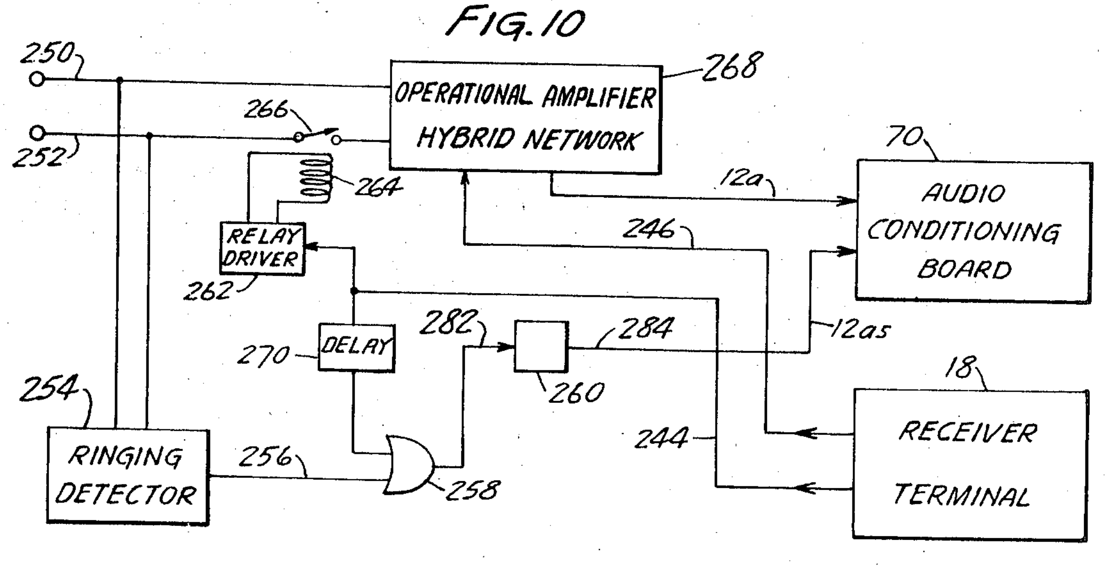
FIG. 10 is a combined block and logic circuit diagram of an interface board which is used for interfacing the terminals of a central telephone exchange with transmitter terminal audio conditioning boards such as the audio conditioning board of FIG. 9 and with the receiver terminal of FIG. 8.
Figure 11:
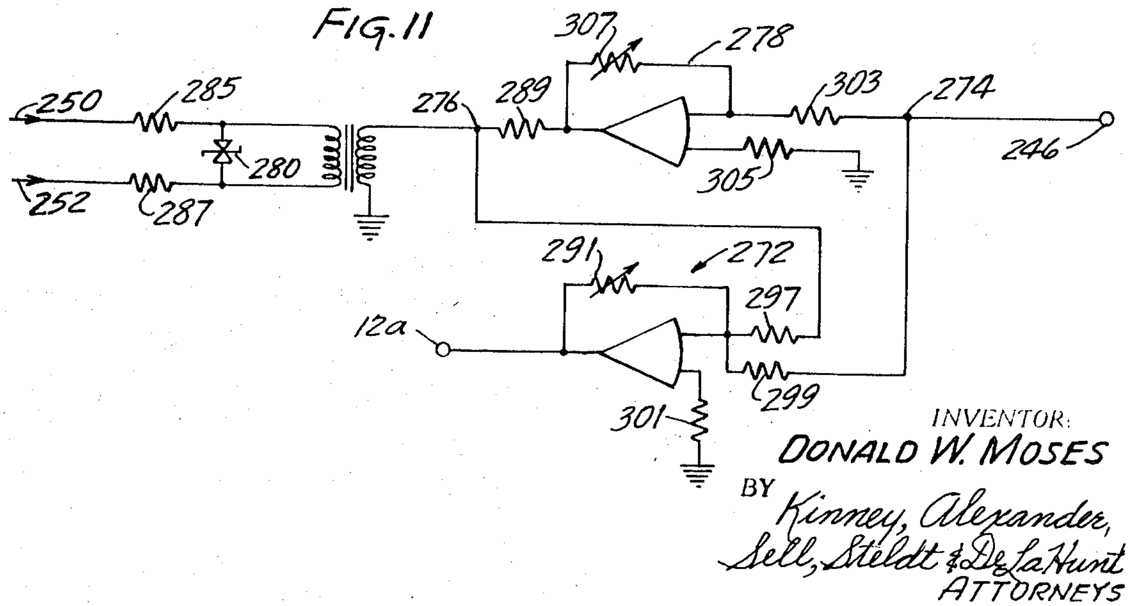
FIG. 11 is a combined logic and schematic circuit diagram of the operational amplifier hybrid network included in the interface board of FIG. 10.
Figure 12:
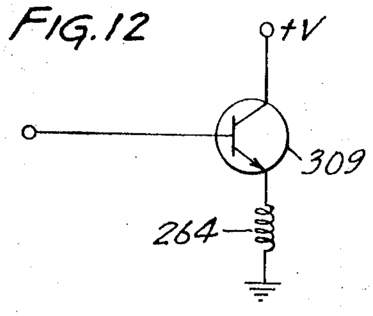
FIG. 12 is a schematic circuit diagram of the relay driver included in the interface board of FIG. 10, and includes in the diagram the coil of the relay being driven.
Figure 14:
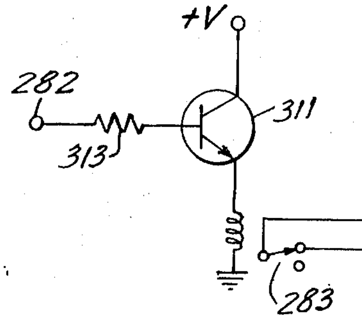
FIG. 14 is a schematic circuit diagram of the conditioning circuit included in the interface board of FIG. 10.
Figure 13:
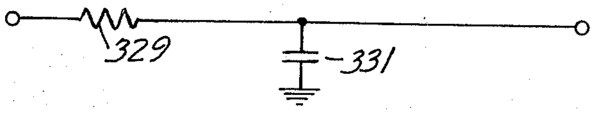
FIG. 13 is a schematic circuit diagram of the delay circuit included in the interface board of FIG. 10.

The relay 264 and relay driver circuit 262, the delay circuit 270, and the conditioning circuit 260, which are shown in block form in FIG. 10, are shown by schematic circuit diagrams in FIGS. 12, 13 and 14, respectively. The operation of the relay driver circuit 262 and relay coil 264 (FIG. 12), and of the delay circuit 270 (FIG. 13) are obvious and will not be discussed.

Concerning the conditioning circuit (FIG. 14), when a logic 1 signal is received at the input terminal 282, the contact 283 is switched from the −V terminal, from which a logic 0 signal is provided at the output line 284, to the open terminal, from which a logic 1 output signal is provided on the output line 284.

Figure 15:
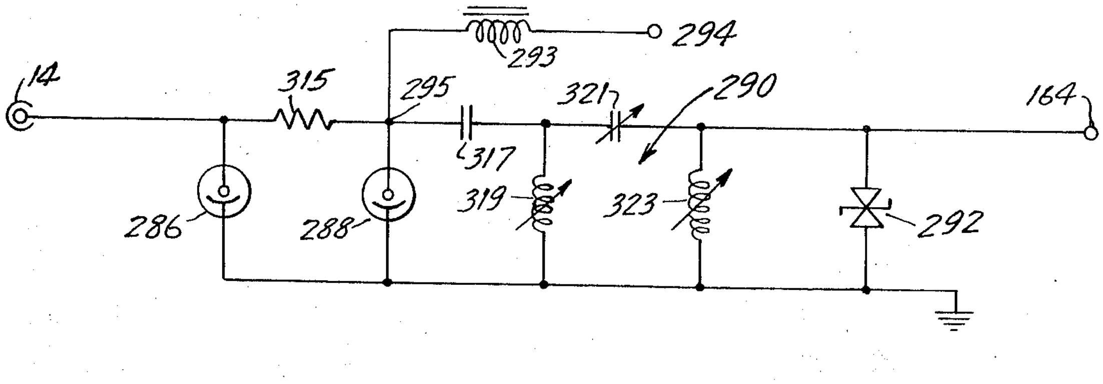
FIG. 15 is a schematic circuit diagram of the cable equalization and protection circuit included in the subscriber terminal of FIG. 7 and in the receiver terminal of FIG. 8.

A schematic circuit diagram of the cable equalization and protection circuit 162 used in the subscriber terminal 16 is shown in FIG. 15. The gas tubes 286 and 288 provide protection for the terminals against sudden voltage surges, such as might be provided by lightning striking near the cable 14. The equalization network 290 equalizes the attenuation inherent in the cable to provide a flat frequency response on the line 164. Final surge protection is provided by the zener diode 292. Terminal 294 is a power terminal. Choke coil 293 isolates the power terminal 294 from the line 295 upon which the time-division multiplexed signal is carried.

The cable equalization and protection circuit 231 used in the receiver terminal 18 of FIG. 8 is also constructed in the same manner as the cable equalization and protection circuit 162 shown in FIG. 15.

Figure 16:
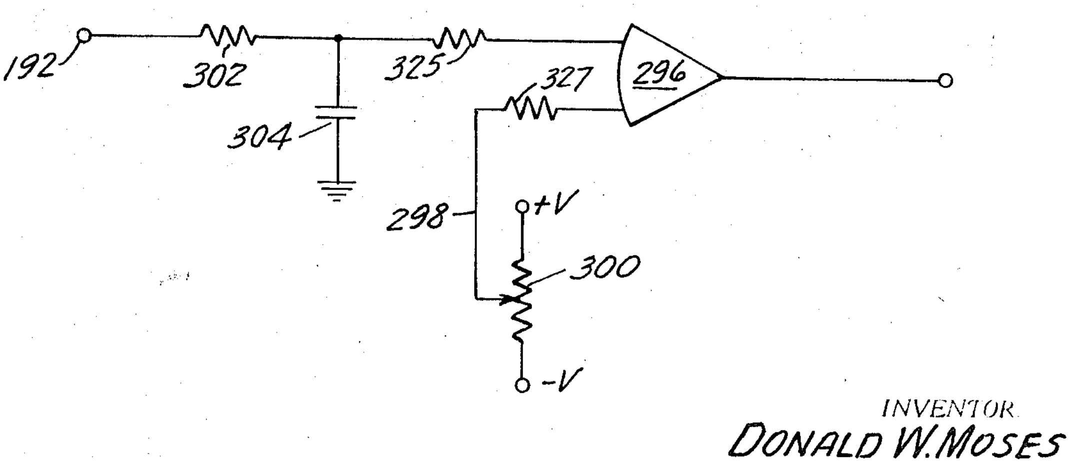
FIG. 16 is a schematic circuit diagram of a DC comparator included in the subscriber terminal of FIG. 7 and in the receiver terminal of FIG. 8.

The DC comparator circuit 184 which is used in the subscriber terminals of FIG. 7 is shown in the schematic circuit diagram of FIG. 16. Either a logic 1 or a logic 0 signal is provided at the output of the operational amplifier 296, depending on whether the amplitude of the voltage received on the input line 192 is greater or less than the amplitude of the voltage on the line 298, the latter being determined by the setting of the potentiometer 300. The resistor 302 and the capacitor 304 serve as an AC filter.

The DC comparator circuit 243 used in the receiver terminal 18 of FIG. 8 is also constructed in the same manner as the DC comparator circuit 184 shown in FIG. 16.

Figure 17:
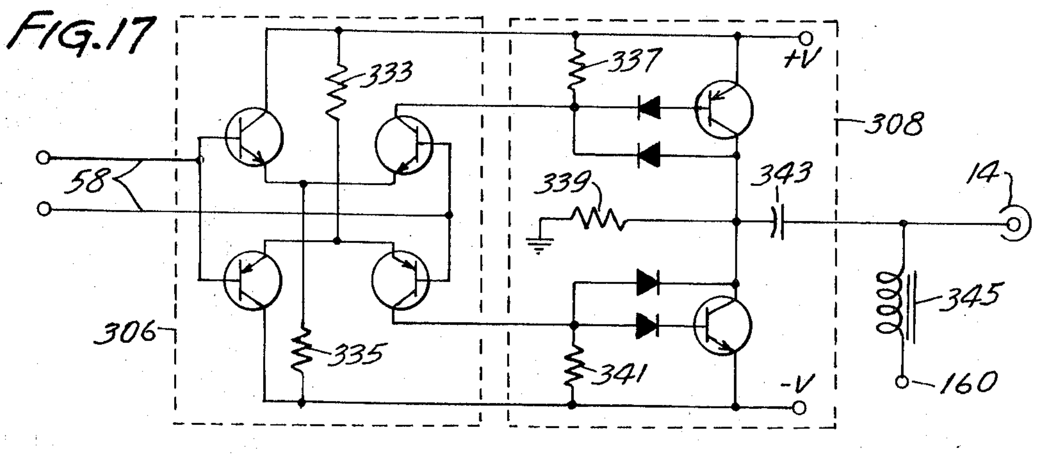
FIG. 17 is a schematic circuit diagram of the coaxial cable line driver included in the transmitter terminal of FIG. 5 and in the subscriber terminal of FIG. 7.

A schematic circuit diagram of the coaxial cable line driver 60 or 204 which is used in the transmitter terminal 10 or a subscriber terminal 16 of FIG. 5 or 7, respectively, is shown in FIG. 17. The time-division multiplexed signal in the form of a pulse train is received on the lines 58. The voltage level of this pulse train is amplified by the voltage amplifier section 306 and the current level of this pulse train is amplified by the current amplifier 308. Terminal 160 is a power terminal.

FIG. 18 is a block diagram of the receiver terminal ring counter/shift register 228. The time-division multiplexed signal is received on line 227. This received signal is fed through the series of logic inverters and time delay elements 310 and AND-gates 312 which constitute a pulse conditioning circuit. This signal is then provided on the line 314 from a pulse conditioning circuit to the shift input of a decade counter 316 which is connected in series with decade counters 318 and 320. The decoders 322, 324 and 326 are connected to the decade counters 316, 318 and 320, respectively, to provide a three-digit decimal representation at the output terminals 328, 330 and 332 indicating the numbered time slot of the time-division multiplexed signal in which information is presently being received. The decade counters 316, 318 and 320 and decoders 322, 324 and 326 constitute a counting means for stepping one count in response to each time slot received during each frame, with the durations between steps being the durations of the time slots.

An output channel gate, such as the AND-gate 334, which indicates whether a signal is presently being received in time slot 1 is connected to the appropriate output terminals of the decoders 322, 324 and 326, respectively. Each sync pulse in the received pulse train is detected by a sync pulse detector and reset circuit consisting of logic inverters 336 and an AND-gate 338. In response to each detected sync pulse, a signal is provided to the reset inputs 340 of each of the decade counters 316, 318 and 320. Output channel gates similar to the AND-gate 334 are appropriately connected to provide similar indications for each time slot corresponding to each working output channel 24 at the receiver terminal 18.

A further word concerning the operation of the integrating circuit 235 and the sample, hold, and reset circuit 237 is now in order. The tapped-off signal from the AND-gate 334 ps provided through the differential output OR-gate 240 to both the integrating circuit 235 and the sample, hold, and reset circuit 237. The integrating circuit 235, in response to the tapped-off signal from the AND-gate 334, provides at the output 341 an integrated signal of linearly varying amplitude during the duration of the corresponding time slot being received (in this case, time slot 1).

The sample, hold, and reset circuit 237, in response to the tapped-off signal from the AND-gate 334 and the integrated signal from the integrating circuit 235, provides an analog output signal on line 238 for the corresponding output channel (channel 1) by sampling the amplitude of the integrated signal during each corresponding time slot, by holding the sampled signal until the next corresponding time slot, and by resetting for resampling upon the recurrence of each corresponding time slot. The integrating circuit 180 and the sample, hold, and reset circuit 182 of the subscriber terminal (FIG. 7) operate in the same manner as do the integrating circuit 235 and the sample, hold, and reset circuit 237.

The band pass filter 245 detects and provides on the line 246 the portion of the analog output signal from the sample, hold, and reset circuit 237. The DC comparator circuit 243 detects and provides on the line 244 the supervisory signal portion of the analog output signal from the sample, hold, and reset circuit 237. The band pass filter 186 and the DC comparator circuit 184 operate in the same manner as do the band pass filter 245 and the DC comparator circuit 243.

Figure 19:
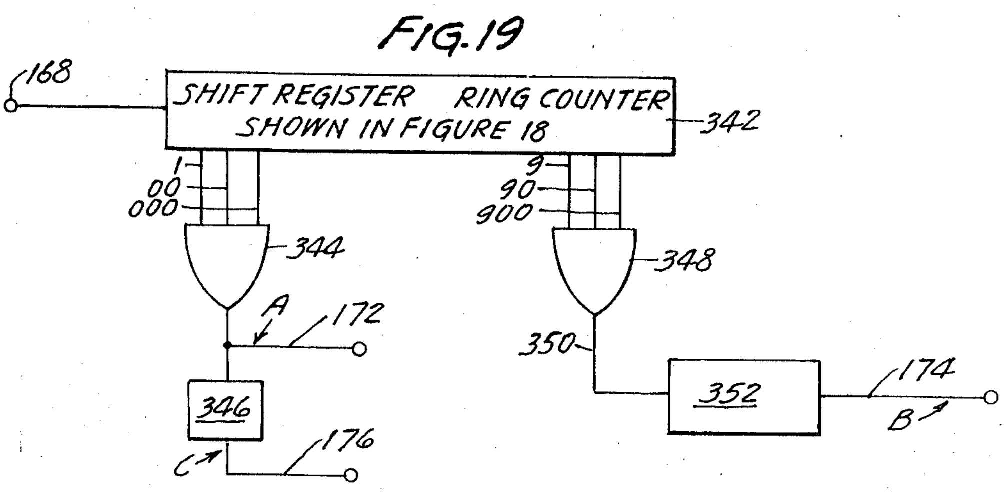
FIG. 19 is a combined block and logic circuit diagram of the ring counter/shift register included in the subscriber terminal of FIG. 7 and includes the circuitry shown in the diagram of FIG. 18.

FIG. 19 is a block diagram of the ring counter/shift register 170 used in the subscriber terminal shown in FIG. 7. The pulse conditioning circuit, decade counters, decoders and sync pulse detector and reset circuit used in the receiver terminal ring counter/shift register circuit shown in FIG. 18 are also used in the subscriber terminal ring counter/shift register circuit 342. This combination is represented by the block 342 in FIG. 19. The appropriate ones of output terminals 328, 330 and 332 which indicate that information is being received during time slot 1 are connected to the output channel AND-gate 344. The output of the AND-gate 344 is connected to output A which provides a signal on the line 172.

The C output is the output of a first pulse circuit. The first output circuit includes a first output gate, which is the AND-gate 344 and a first one-shot multivibrator 346. The output of the AND-gate 344 is connected to the trigger input of the first one-shot multivibrator 346. A first pulse signal is provided at the output C of the first one-shot multivibrator 346 in response to the leading edge of the tapped-off signal provided from the first output AND-gate 344 during the interval in which time slot 1 of the time-division multiplexed signal is being received. This first pulse signal is thus provided onto line 176 at the end of each sync pulse of the time-division multiplexed signal.

The B output is the output of a second pulse circuit. The second output circuit includes a second one-shot multivibrator 352 and a second output gate, which is an AND-gate 348. Appropriate ones of the terminals 328, 330 and 332 are connected to the AND-gate 348 to provide a tapped-off signal on the line 350 simultaneous with the interval during which the last time slot in the time-division multiplexed signal is received on line 168. Ordinarily, terminals 328, 330 and 332 corresponding to time slot 999 would be connected to the input of the AND-gate 348. A tapped-off signal corresponding to the last time slot is provided on the line 350 from the AND-gate 348 to the trigger input of the one-shot multivibrator 352. A second pulse signal is provided at output B onto the line 174 in response to the trailing edge of this tapped-off signal.

The operation of the telephone set hybrid interface and ring circuit 190 of the subscriber terminal of FIG. 7 which is shown in schematic diagram in FIG. 20 will now be described. When a supervisory signal indicating a ringing function is received on the supervisory signal line 194, from the DC comparator circuit 184, the current through the relay coil 354 causes the first switch contact 356 to close in order to connect a source of AC voltage VAC to the yellow telephone wire 20*y* to enable the ringing of a telephone set. When the telephone set receiver is taken off the hook, a DC path is completed at the telephone set between the red and green telephone lines 20*r* and 20*g*. This completes a current path through relay coil 358 which in turn moves the second switch contacts 360 and 362 from the normally closed position shown in FIG. 20. The movement of the second switch contact 362 places a logic 1 supervisory signal indicating an off-hook condition on the supervisory signal line 198. The movement of the second switch contact 360 disables the operation of the relay coil 354 and opens the first switch contact 356 so as to prevent enabling of further ringing of the telephone set through the line 20*y*. When a dialing signal is provided between the lines 20*r* and 20*g* from the telephone set connected thereto, the second switch contact 362 is opened and closed to provide a supervisory signal indicating a dialing pulse on the line 198.

The audio portion of the analog output signal from the subscriber terminal band pass filter 186 is provided via the line 188 to a terminal 364. This signal is fed through a first operational amplifier 366, wherein it is inverted, to a terminal 368. The audio signal being transmitted from the telephone set via the lines 20*r* and 20*g* through the transformer 370 also is present at the terminal 368. Thus, the signal appearing at terminal 368 represents a summation of the audio signal being received on line 188, which is inverted at the output of the first operational amplifier circuit 366, and the audio signal being received from the telephone set on lines 20*r* and 20*g*. The signal appearing at terminal 368 and the signal appearing at terminal 364 are additively fed to a first input of a second operational amplifier 372. Thus, the signal provided at the output of the second operational amplifier 372 on the line 196 is, in effect, the audio signal being transmitted from the telephone set via telephone lines 20*r* and 20*g*.

Figure 21:
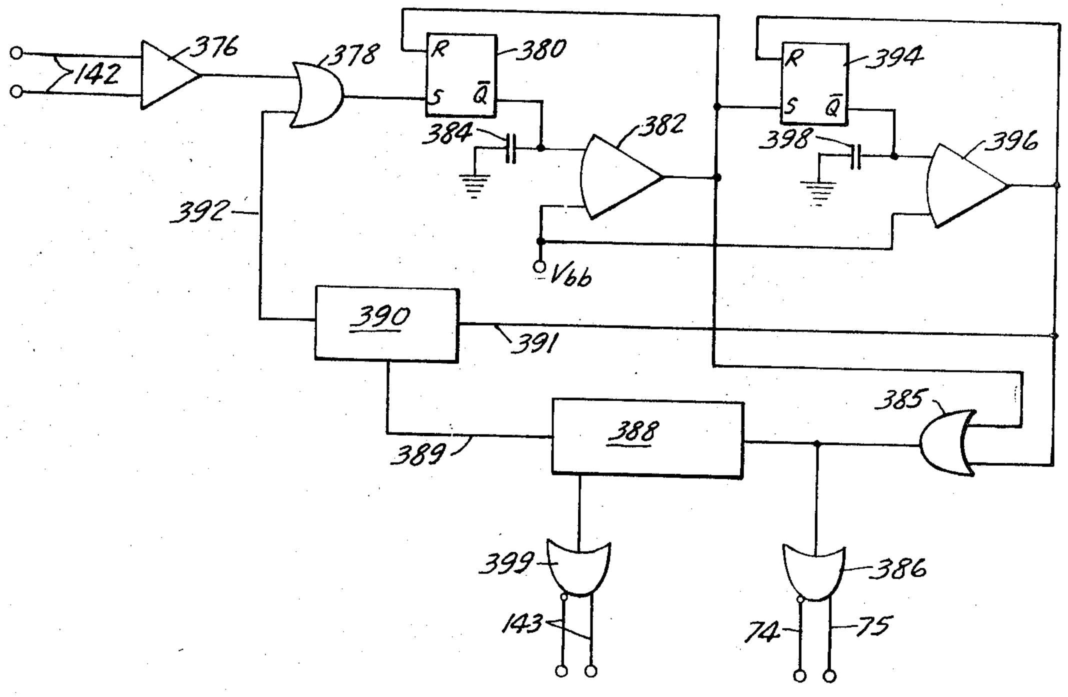
FIG. 21 is a combined block, logic, and schematic circuit diagram of a channel reservation board included in the transmitter terminal of FIG. 5.

The channel reservation board 72, which is shown in FIG. 21, will now be described. When a signal, indicating that the next preceding pulse is delivered to the OR-gate 77, is received on the lines 142 from a modulator channel board 64, or from another channel reservation board 72, the line receiver 376 delivers a logic 1 pulse to an input of an OR-gate 378 which in turn delivers a logic 1 pulse to the set input of a first flip-flop 380. This in turn causes a logic 0 signal to be delivered from the $\overline{Q}$ output of the first flip-flop 380 to a first input of a paired first operational amplifier 382. When the voltage level of the signal from the $\overline{Q}$ output of the first flip-flop 380 falls below the adjustable bias voltage level $V_{bb}$ which is provided to the second input of the first operational amplifier 382, a logic 1 pulse is delivered from the output of the first operational amplifier 382. The selected value of a first capacitor 384, which is also connected to the first operational amplifier first input, and the value of the bias voltage $V_{bb}$ determine the duration required for the voltage level of the signal from the Q output of the first flip-flop 380 to fall below the level of the voltage provided from the source $V_{bb}$. The logic 1 output pulse signal from the first operational amplifier 382 is delivered through an OR-gate 385 to the differential output gate 386 and onto the lines 74 and 75 to a line receiver 76. The logic 1 pulse signal from the OR-gate 385 is also delivered to the step input of a counting means, such as a decade counter 388. The decade counter 388, in addition to counting this first pulse signal, provides a control signal from its first output on line 389 to open a line gate 390 so that signals may be passed from line 391 to line 392. The logic 1 output pulse from the first operational amplifier 382 is also provided to the reset input of the first flip-flop 380, thereby resetting the first flip-flop 380 and terminating the logic 1 pulse from the first operational amplifier 382.

The logic 1 signal from the first operational amplifier 382 is further provided to Set input of a second flip-flop 394, thereby causing a logic 0 pulse to be delivered from the $\overline{Q}$ output of the second flip-flop 394 to a first input of a paired second operational amplifier 396. A second input of the second operational amplifier 396 is connected to the bias voltage source $V_{bb}$. A second capacitor 398 which is also connected to the second operational amplifier first input has the same selected value as the capacitor 384 so that a logic 1 pulse is delivered from the output of the second operational amplifier 396 at approximately the same interval following the setting of the second flip-flop 394 as a logic 1 pulse is delivered from the first operational amplifier 382 following the setting of the first flip-flop 380. The logic 1 pulse from the second operational amplifier 396 is provided through the OR-gate 385 to the differential output gate 386 and onto the lines 74 and 75 to the line receiver 76. The logic 1 output from the second operational amplifier 396 is also fed through the OR-gate 385 to the decade counter 388. The logic 1 output from the second operational amplifier 396 is further delivered to the reset input of the second flip-flop 394, thereby resetting the second flip-flop 394 and terminating the logic 1 pulse from the second operational amplifier 396. The logic 1 pulse from the second operational amplifier 396 is additionally provided through the line gate 390 and through the OR-gate 378 to the set input of the first flip-flop 380, thereby initiating another pulse from the first operational amplifier 382 which is accordingly delivered onto the lines 74 and 75 and recorded by the decade counter 388. Upon the decade counter 388 recording the receipt of ten pulses, a signal is delivered on line 389 from the decade counter first output to the line gate 390 to close the line gage 390 to the passage of signals from line 391 to line 392. Also, upon the decade counter 388 counting ten pulses, the decade counter is reset, and a signal is delivered from the decade counter second output to the differential output gage 399 which provides a last pulse indicating signal on the lines 143, which last pulse indicating signal is delivered either to the next channel reservation board 72, a modulator channel board 64, or the last modulator channel board of the transmitter terminal 66. This last pulse indicating signal indicates that the last of the ten pulses from the channel reservation board 72 is being delivered to an input of the OR-gate 77.

Figure 22:
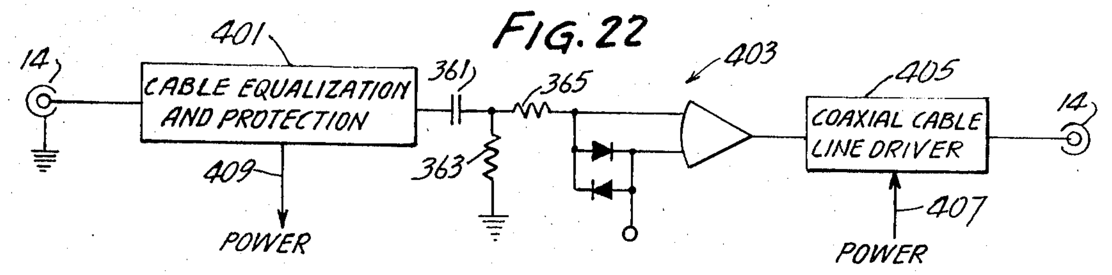
FIG. 22 is a combined block and schematic circuit diagram of a regenerator of FIGS. 1–3.

A diagram for a pulse regenerator 26 is shown in FIG. 22. A time-division multiplexed signal received from the wideband circuit 14 is fed through a cable equalization and protection circuit 401 to a comparator circuit 403, wherein the signal is shaped. The shaped signal is then fed to a coaxial cable line driver 405 from which it is again placed onto the wideband circuit 14. The cable equalization and protection circuit 401 use in the pulse regenerator 26 is also constructed in the same manner as the cable equalization and protection circuit 162 shown in FIG. 15.

Figure 23:
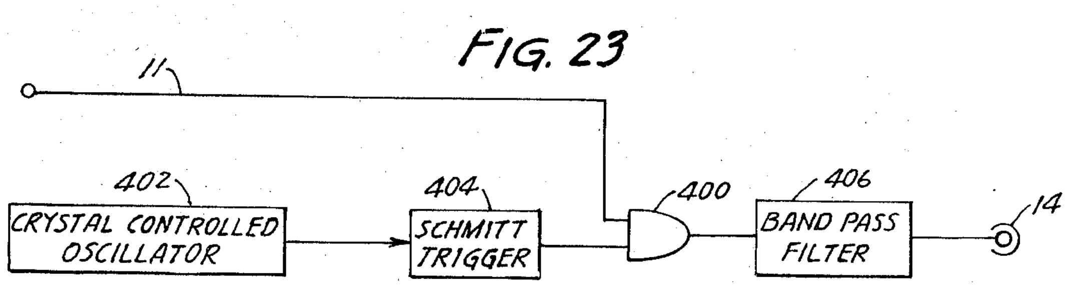
FIG. 23 is a combined block and logic circuit diagram of the modulator located at the central exchange office in the non-closed-loop system of FIG. 3.

Now, considering the nonclosed-loop embodiment of the present invention, a modulator circuit 43 and a demodulator circuit 50, both of which are shown in FIG. 3, are diagrammatically shown in FIGS. 23 and 24, respectively, and will now be discussed. The time-division multiplexed signal from the transmitter terminal 10 is received on line 11. This signal corresponds to the signal placed on the wideband circuit 14 by the transmitter terminal 10 as shown in FIG. 5. This received time-division multiplexed signal is furnished on line 11 to one input of an AND-gate 400. The crystal-controlled oscillator 402 provides a high frequency signal, such as a 140 megahertz signal, through a Schmitt trigger circuit 404 to a second input of the AND-gate 400. The time-division multiplexed signal appearing the output of the AND-gate 400 is thus a modulated signal having a center frequency corresponding to the frequency of the signal provided by the crystal-controlled oscillator 402, such as approximately 140 megahertz. This modulated signal is fed through the band-pass filter 406 onto the wideband circuit 14. In a preferred embodiment, the band pass filter 406 passes only so much of the modulated time-division multiplexed signal as is contained in a band width between approximately 108 and 174 megahertz.

Figure 24:
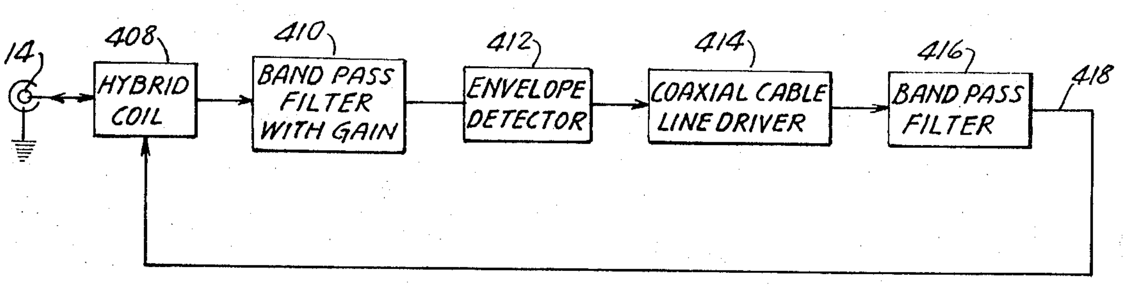
FIG. 24 is a block diagram of the demodulator located at the remote location in the non-closed loop system of FIG. 3.

Referring to the demodulator circuit of FIG. 24, the modulated time-division multiplexed signal is received from the wideband circuit 14 by a hybrid coil 408 which acts as a directional coupler by passing the signal received from the wideband circuit 14 to a band pass filter 410. The band pass filter 410 has a built-in gain and thereby amplifies the received modulated time-division multiplexed signal. This signal is demodulated by passing it through an envelope detector 412. The demodulated signal is then fed through a coaxial cable line driver 414 and a band pass filter 416 which passes signals within a band width of such width as not to interfere with such other communications over the same physical circuit as CATV. In a preferred embodiment, this band width is approximately from 1 megahertz to 50 megahertz. The time-division multiplexed signal provided on line 418 is in approximately the same frequency band as the signal delivered to the modulator circuit on line 11 or as is transmitted through the closed-loop system of FIG. 2. This signal is delivered through the directional coupler hybrid coil 408 onto the wideband circuit 14 for transmission to the subscriber terminals 16.

In an exemplary embodiment of the closed loop system of the present invention, components identified as follows were used. (All resistance values are given in ohms and all capacitance values are given in microfarads.) All voltage sources +V and −V are +5 volts and −5 volts, respectively. All $-V_{bb}$ bias voltage sources are set at about −1.17 volts. Power is applied on the lines 160, 294, 367, 369, 407, and 409.

Transmitter Terminal (FIG. 5)

| | |
|---|---|
| Clocking signal generator **88**: | 10 kHz. crystal clock: Model IC5HI manufactured by Connor Winfield Corp., Winfield, Ill. |
| level translator **90**: | MC1217F |
| one-shot multivibrator **96**: | Each OR Gate: ½MC1204F Capacitor **97**: 0.00047 |
| pulse train generating flip-flop **83**: | MC1213F |
| each line receiver **76, 82 154**: | ¼MC1220F |
| OR-gate **77**: | 25 MC1204F's |

Modulator Channel Board (FIG. 6)

| | |
|---|---|
| each operational amplifier: | ¼MC1220F |
| each flip-flop: | ½MC1215F |
| each OR Gate: | ½MC1204F |
| line receiver **102**: | ¼MC1220F |
| capacitor **114** and like first input coupled capacitors: | 0.001 |
| capacitor **118** and like second input coupled capacitors: | 0.22 |

Subscriber Terminal (FIG. 7)

| | | |
|---|---|---|
| comparator **166**: | ¼MC1220F | |
| OR-Gate **178**: | ½MC1204F | |
| OR-Gate **202**: | ½MC1204F | |
| inverter **210**: | ¼MC1220F | |
| transmitter flip-flop **212**: | MC 1213F | |
| flip-flop **216**: | ½MC1215F | |
| operational amplifier **218**: | ¼MC1220F | |
| band-pass filter **186** | Operational amplifier chebychev filter consisting of Model No. 5702–LP3 C in series with Model No. 5702–HP3a8C, available from Burr Brown Research Corp., International Airport Industrial Park, Tucson, Ariz., 85706 | |
| Integrating circuit **180**: | Capacitor **171**: | 0.0003 |
| | Resistor **169**: | 270 |
| | Resistor **173**: | 270 |
| | NPN-transistor **175**: | 2N3566 |
| Sample, Hold, and Reset Circuit **182**: | PNP-transistor **177**: | 2N1499 |
| | PNP-transistor **179**: | 2N1499 |
| | Capacitor **181**: | 0.05 |
| | Capacitor **187**: | 0.01 |
| | Capacitor **189**: | $68\times10^{-6}$ |
| | Resistor **185**: | 27 K. |
| | Resistor **191**: | 1 K. |
| | Resistor **209**: | 22 K. |
| Voltage translator circuit **222**: | NPN-transistor **193**: | 2N3566 |
| | Capacitor **195**: | 0.22 |
| | Resistor **197**: | 270 |
| | Resistor **199**: | 6.8 K. |
| | Resistor **201**: | 680 |
| Voltage translator circuit **224**: | OR Gate: | ¼MC1212F |
| | Variable Resistor **203**: | 20 |
| | Resistor **205**: | 820 |
| | Resistor **207**: | 430 |
| Capacitor **163**: | 0.01 | |
| Resistor **165**: | 10 K. | |
| Resistor **167**: | 10 K. | |

Receiver Terminal (FIG. 8)

| | | |
|---|---|---|
| Capacitor **211**: | 0.01 | |
| Resistor **213**: | 10 K. | |
| Resistor **215**: | 10 K. | |
| Comparator **233**: | ¼MC1220F | |
| OR-Gate **240**: | ½MC1204F | |
| Band-Pass Filter **245** | Same as in FIG. 7 | |
| Integrating Circuit **235**: | NPN-transistor **217**: | 2N3566 |
| | Capacitor **221**: | $300\times10^{-6}$ |
| | Resistor **219**: | 270 |
| | Resistor **223** | 270 |
| Sample, Hold, and Reset Circuit **237**: | PNP-transistor **225**: | 2N1499 |
| | PNP-transistor **227**: | 2N1499 |
| | Capacitor **253**: | $68\times10^{-6}$ |
| Capacitor **255**: | | 0.05 |
| | Capacitor **261**: | 0.01 |
| | Resistor **257**: | 22 K. |
| | Resistor **259**: | 1 K. |
| | Resistor **263**: | 27 K. |

Audio Conditioning Board (FIG. 9)

| | |
|---|---|
| Variable resistor **273**: | 20 |
| Capacitor **265**: | 0.22 |
| Resistor **267**: | 270 |
| Resistor **269**: | 6.8 |
| Resistor **271**: | 680 |
| Resistor **275**: | 820 |
| Resistor **277**: | 430 |
| NPN-transistor **279**: | 2N3566 |
| OR-Gate **281**: | ¼MC1212F |

| | |
|---|---|
| Interface Board (FIG. **10**) | |
| Ringing detector **254**: | Electron Relay A 915–20 **Manufacturer: U.S. Instrument Corp., Charlottesville, Va.** |
| OR-Gate **258**: | 1N34A Diode Matrix |

| | |
|---|---|
| Operational Amplifier Hybrid Network | (FIG. **11**) |
| Operational amplifier **272**: | Fairchild 702 |
| Operational Amplifier **278**: | Fairchild 702 |
| Zener diode **280**: | Two 3.6-volt, ½-watt Zener diodes connected back-to-back |
| Resistor **285**: | 470 |
| Resistor **287**: | 470 |
| Resistor **289**: | 470 |
| Variable Resistor **291**: | 1 K. |
| Resistor **297**: | 470 |
| Resistor **299**: | 470 |
| Resistor **301**: | 1 K. |
| Resistor **303**: | 470 |
| Resistor **305**: | 1 K. |
| Variable resistor **307**: | 1 K. |

Relay Driver (FIG. 12)

| | |
|---|---|
| Relay **264**: | Reed Relay; 1,000-ohm coil |
| NPN-transistor **309**: | 2N3566 |

Delay Circuit (FIG. 13)

| | |
|---|---|
| Resistor **329**: | 100 |
| Capacitor **331**: | 10, 6 volts DC |

Conditioning Circuit (FIG. 14)

| | |
|---|---|
| Relay **283**; | Reed Relay; 1,000-ohm coil |
| NPN-transistor **311**: | 2N3566 |
| Resistor **313**: | 470 |

Cable Equalization and Protection Circuit (FIG. 15)

| | |
|---|---|
| Gas tubes **286** and **288**: | Discharge voltage rating determined by powering method over coaxial cable |
| Zener diode **292**: | Two 3-volt Zener diodes connected back-to-back |
| Choke coil **293**: | 1 h. |
| Resistor **315**: | 10 |
| Capacitor **317**: | 0.001 |
| Variable inductor **319**: | Values to be selected |
| Variable capacitor **321**: | according to coaxial cable |
| Variable inductor**323**: | type and parameters |

DC Comparator Circuit (FIG. 16)

| | |
|---|---|
| Potentiometer **300**: | 10 K. |
| Resistor **302**: | 1 K. |
| Capacitor **304**: | 1, 6 volts DC |
| Resistor **325**: | 1 K. |
| Resistor **327**: | 1 K. |
| Operational amplifier **396**: | Fairchild 710 |

Coaxial Cable Line Driver (FIG. 17)

| | |
|---|---|
| Each NPN-transistor: | 2N3960 |
| Each PNP-transistor: | 2N4261 |
| Resistor **333**: | 820 |
| Resistor **335**: | 620 |
| Resistor **337**: | 500 |
| Resistor **339**: | 75 |

| | |
|---|---|
| Resistor 341: | 500 |
| Capacitor 343: | 0.001 |
| Choke Coil 345: | 0.75 h. |

Receiver Terminal Ring Counter/Shift Register Circuit (FIG. 18)

| | |
|---|---|
| Inverters 310: | MC836L |
| AND-Gate 312: | MC849L |
| each decade counter 316, 318, 320 | MC838L |
| each decoder 322, 324, 326 | Fairchild CCSL 9301 |
| Inverters 336: | MC839L |
| AND-Gate 338: | MC849L |
| Capacitor 347: | 0.005 (Value needs to be trimmed in each unit) |

Subscriber Terminal Ring Counter/Shift Register Circuit (FIG. 19)

| | |
|---|---|
| each AND-Gate 344, 346: | MC836L and MC849L combination |
| one-shot multivibrator 346: | 25-Nano-second pulse width, and having leading edge trigger |
| one-shot multivibrator 352: | 25-Nano-second pulse width, and having trailing edge trigger |

Figure 20:
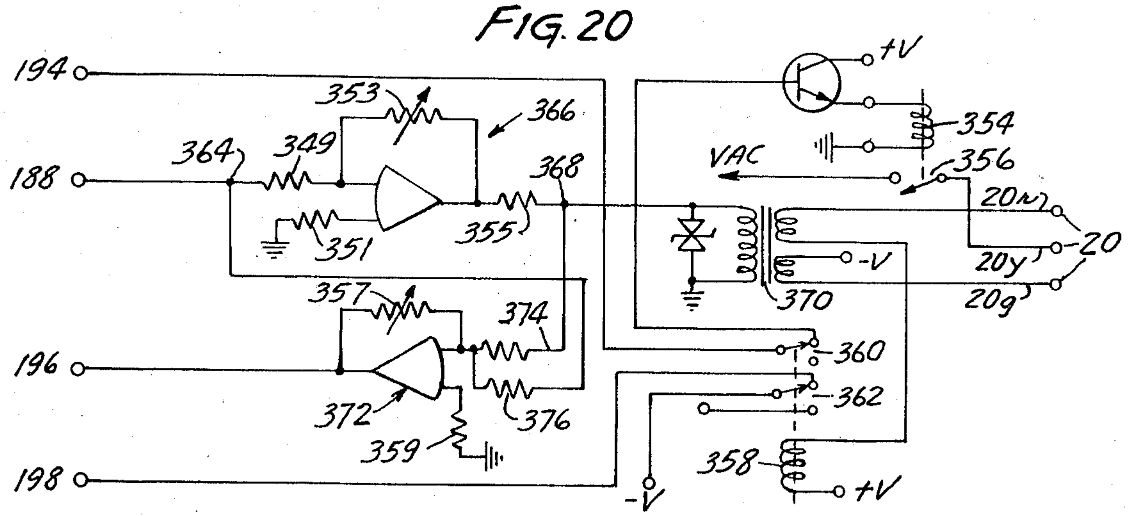
FIG. 20 is a schematic circuit diagram of a telephone set hybrid interface and ring circuit included in the subscriber terminal of FIG. 7.

Telephone Set Hybrid Interface and Ring Circuit (FIG. 20)

| | |
|---|---|
| NPN-transistor: | 2N3566 |
| Relay 354: | Reed Relay, 1,000-ohm coil |
| Relay 358: | Reed Relay, 200-ohm coil |
| Operational amplifier 366: | Fairchild 702 |
| Operational amplifier 372: | Fairchild 702 |
| Transformer 370: | Primary: 1,200 ohm; Secondary: two 450-ohm windings |
| Resistor 349: | 470 |
| Resistor 351: | 1 K. |
| Variable resistor 353: | 1 K. |
| Resistor 355: | 470 |
| Variable resistor 357: | 1 K. |
| Variable resistor 359: | 1 K. |
| Resistor 374: | 470 |
| Resistor 376: | 470 |
| Zener diode: | Two 5-volt zener diodes connected back-to-back |

Channel Reservation Board (FIG. 21)

| | |
|---|---|
| Line receiver 376: | ¼MC1220F |
| Each OR-Gate 378, 385, 386, 399: | ½MC1204F |
| each flip-flop 380, 394: | ½MC1215F |
| each operational amplifier 382, 396: | ¼MC1220F |
| Decade counter 388: | Two MC1215F's |
| Line gate 390: | MC1204F |

Pulse Regenerator (FIG. 22)

| | |
|---|---|
| Capacitor 361: | 0.01 |
| Resistor 363: | 10 K. |
| Resistor 365: | 10 K. |
| Operational amplifier 403: | ¼MC1220F |

In another preferred embodiment, a modified zero-axis crossing modulation scheme is used. Instead of defining each time slot as the interval between successive zero-axis crossing, as is described in the second paragraph of the Summary Of The Invention portion of this specification, each time slot is defined by the interval between each zero-axis crossing and a previous reference zero-axis crossing. Different previous reference zero-axis crossings may be used to define different time slots.

Referring to FIG. 4A, time slot 1 is defined by the interval between zero-axis crossing *a* and the end of the sync pulse, the latter being a previous reference zero-axis crossing. Time slot 2 is defined by the interval between zero-axis crossing *b* and the end of the sync pulse; time slot 3 is defined by the interval between zero-axis crossing *c* and zero-axis crossing *b*; time slot

4 is defined by the interval between zero-axis crossing *d* and zero-axis crossing *b*; and time slot 5 is defined by the interval between zero-axis crossing *e* and the end of the sync pulse. In defining time slots 4 and 3, zero-axis crossing *b* is the previous reference zero-axis crossing.

When using this modified zero-axis crossing modulation scheme, the modulator channels are interconnected so that the paired flip-flop of each modulator channel is set upon the previous reference zero-axis crossing such that sampling of the analog signal provided to the second input of the paired operational amplifier for that modulator channel commences upon the previous reference zero-axis crossing.

In the situation where successive time slots such as time slots 1 and 2 are defined by reference to the same previous reference zero-axis crossing, such as the end of the sync pulse, one of two techniques is used to assure that the modulator channel providing the pulse for defining the end of time slot 2 does not provide said pulse before the output pulse from the first modulator channel for defining the end of the first time slot. Either the analog input signal to the second input of the operational amplifier of the second modulator channel is biased at a level above the maximum voltage level of the analog input signal applied to the second input of the operational amplifier of the first modulator channel; or the respective analog input signals containing information corresponding to the first and second time slots are additively applied to the second input of the operational amplifier of the second modulator channel.

In another preferred embodiment of the modified zero-axis crossing modulation scheme (again referring to FIG. 4A), time slot 1 is defined as the interval between zero-axis crossing *b* and zero-axis crossing *a* and time slot 2 is defined as the interval between zero-axis crossing *d* and zero-axis crossing *c*, etc.

What is claimed is:

1. A time-sharing subscriber communications system wherein a time-division multiplexed signal, containing information related to various subscriber terminals in various time slots of each frame, is carried in a given frequency band over a single wideband circuit connected to the various subscriber terminals, which system comprises a wideband circuit for carrying signals within a wideband of frequencies including a given frequency band;

a plurality of subscriber terminals connected in series in the wideband circuit; and a transmitter terminal connected to a first given number of input channels which are sources of analog input signals and interfaced to the wideband circuit at one end of the series-connected subscriber terminals, for transmitting in the given frequency band, a time-division multiplexed signal having a series of frames and a predetermined number of time slots in each frame, which transmitter terminal comprises a modulating means for modulating the transmitted signal to provide a transmitted time-division multiplexed signal containing time slots and for placing in the time slots, in a predetermined order related to the series order of the subscriber terminals, information corresponding to analog input signals received from various input channels respectively related to various ones of the subscriber terminals; and each of which subscriber terminals comprises a demodulating means for tapping off from the time-division multiplexed signal received on the wideband circuit the information contained in the one or more time slots related to that subscriber terminal, and for providing one or more analog output signals respectively corresponding to the tapped-off information;

characterized by the feature that during each frame the transmitter terminal modulating means (a) provides, in the predetermined order, a predetermined number of pulses corresponding to the predetermined number of time slots, wherein the pulses are spaced at intervals corresponding to the values of said received analog input signals, and (b) instantaneously switches the voltage level of the time-division multiplexed signal transmitted on the wideband circuit across the nominal zero axis between a nominal positive value and a nominal negative value in response to each provided pulse, whereby each time slot is defined by the interval between successive said zero-axis crossings and the information contained in each time slot is defined by the duration of said each time slot.

2. A time sharing subscriber communications system according to claim 1, wherein the subscriber terminal further comprises a transmitting means for retransmitting a portion of the time-division multiplexed signal received on the wideband circuit and for newly transmitting in one or more of the various time slots of each frame new information related to said subscriber terminal, wherein each frame of the time-division multiplexed signal transmitted from the subscriber terminal transmitting means contains the predetermined number of time slots.

3. A time-sharing subscriber communications system according to claim 2, further comprising a subscriber terminal interface circuit comprising a first terminal operatively coupled to the subscriber terminal demodulating means for receiving the analog output signal;

a first operational amplifier having a first input coupled to the first terminal and a second input coupled to ground, wherein a signal provided at the first operational amplifier first input is inverted at the first operational amplifier output;

a second terminal operatively coupled to a subscriber output system for providing at the second terminal an analog signal containing new information related to said subscriber terminal and operatively coupled to the output of the first operational amplifier, wherein at the second terminal there appears the sum of said analog signal containing new information related to said subscriber terminal and a signal from the output of the first operational amplifier; and a second operational amplifier having a first input which is connected for additively receiving signals from the first and second terminals, a second input which is connected to ground, and an output which is operatively coupled to the subscriber terminal transmitting means, whereby the analog signal containing new information related to said subscriber terminal is provided from the output of the second operational amplifier to the subscriber terminal transmitting means, and whereby the analog output signal is provided from the second terminal to said subscriber output system.

4. A time-sharing subscriber communications system according to claim 2, further comprising a receiver terminal connected to a second given number of output channels which can carry analog output signals and interfaced to the wideband circuit for receiving in the given frequency band at the opposite end of the series-connected subscriber terminals, a time-division multiplexed signal having a series of frames and the predetermined number of time slots in each frame, which receiver terminal comprises a demodulating means for tapping off from the time-division multiplexed signal received on the wideband circuit the newly transmitted information contained in the time slots related to each of the subscriber terminals, and for providing analog output signals corresponding to the tapped-off information to various output channels respectively related to various ones of the subscriber terminals.

5. A time-sharing subscriber communications system according to claim 4, wherein the receiver terminal is located at a first location and interfaced with the wideband circuit in the given frequency band at the first location and the transmitter terminal is located at the first location and interfaced with the wideband circuit in the given frequency band at a remote location, and wherein the system further comprises a modulator at the first location for placing the transmitted time-division multiplexed signal on the wideband circuit at the first location in a second frequency band; and a demodulator at the remote location for removing the transmitted time-division multiplexed signal from the second frequency band and for placing the transmitted time-division multiplexed signal on the wideband circuit at the remote location in the given frequency band.

6. A time-sharing subscriber communications system according to claim 4, wherein the receiver terminal demodulating means comprise a ring counter/shift register operatively coupled to the wideband circuit for receiving the time-division multiplexed signal, which ring counter/shift register comprises counting means for stepping one count in response to each time slot received during each frame, with the durations between steps being the durations of the time slots; and output terminals connected to the counting means, at various different combinations of which output terminals, signals are provided, in response to the stepping, during the intervals while each different time slot is being received;

a plurality of output channel gates corresponding to the number of output channels, each of which output channel gates is connected to different combinations of the ring counter/shift register output terminals, wherein tapped-off signals are provided from the various output channel gates during the interval in which the time slot corresponding to the output channel to which the output channel gate corresponds is being received;

a plurality of integrating circuits, each of which is operatively coupled to one of the output channel gates for providing, in response to the tapped-off signal, an integrated signal of linearly varying amplitude during the duration of the corresponding time slot being received; and a plurality of sample, hold, and reset circuits, each of which is operatively coupled to one of the output channel gates and to the integrating circuit which is coupled to the same output channel gate, for providing an analog output signal for the corresponding output channel, by sampling the amplitude of the integrated signal during each corresponding time slot, by holding the sampled signal until the next corresponding time slot, and by resetting for resampling upon the recurrence of each corresponding time slot.

7. A time-sharing subscriber communications system according to claim 4, further comprising an interface circuit for interfacing a transmitter terminal first input channel and a receiver terminal first output channel to a pair of communication lines, which interface circuit comprises a first terminal operatively coupled to the receiver terminal first output channel for receiving the analog output signal;

a first operational amplifier having a first input coupled to the first terminal and a second input coupled to ground, wherein a signal provided at the first operational amplifier first input is inverted at the first operational amplifier output;

a second terminal operatively coupled to the pair of communication lines and to the output of the first operational amplifier, for providing at the second terminal the sum of an analog input signal from the pair of communication lines and the output signal from the operational amplifier; and a second operational amplifier having a first input which is connected for additively receiving signals from the first and second terminals, a second input which is coupled to ground, and an output which is operatively coupled to the transmitter terminal first input channel;

whereby the analog input signal is provided from the output of the second operational amplifier to the transmitter terminal first input channel; and whereby the analog output signal is provided from the second terminal to said communication lines.

8. A time-sharing subscriber communications system according to claim 4, wherein telephone services are provided; wherein a transmitter terminal first input channel comprises an audio signal input line and a supervisory signal input line; wherein a receiver terminal first output channel comprises an audio signal output line and a supervisory signal output line; and wherein the time sharing subscriber communications system further comprises an interface circuit for interfacing the transmitter terminal first input channel and the receiver terminal first output channel to a pair of telephone lines, which interface circuit comprises a first terminal operatively coupled to the audio signal output line of the receiver terminal first output channel for receiving an audio output signal portion of the analog output signal;

a first operational amplifier having a first input coupled to the first terminal and a second input coupled to ground, wherein a signal provided at the first operational amplifier first input is inverted at the first operational amplifier output;

a second terminal operatively coupled to said pair of telephone line terminals and to the output of the first operational amplifier, for providing at the second terminal the sum of an audio input signal from said pair of telephone lines and the output signal from the first operational amplifier;

a second operational amplifier having a first input which is connected for additively receiving signals from the first and second terminals, a second input which is coupled to ground, and an output which is operatively coupled to the audio signal input line of the transmitter terminal first input channel;

a ringing detector circuit connected to said pair of telephone lines and operatively coupled to the supervisory signal input line of the transmitter terminal first input channel, which ringing detector circuit, in response to detecting a ringing signal from said pair of telephone lines, provides a supervisory signal indicating a ringing signal to said supervisory signal input line;

a first switch in one line of said pair of telephone lines;

a relay driver circuit and relay for operating the first switch, which relay driver is operatively coupled to the supervisory signal output line of the receiver terminal first output channel for operating the first switch to provide a dialing pulse on the telephone line in response to the receipt of a supervisory signal indicating a dialing pulse from the supervisory signal output line of the receiver terminal first output channel, and for closing the first switch in response to the receipt of a supervisory signal indicating an off-hook signal from the supervisory signal output line of the receiver terminal first output channel for enabling the operative coupling of the second terminal to said pair of telephone lines;

whereby said audio input signal is provided from the output of the second operational amplifier to the audio signal input line of the transmitter terminal first input channel; and whereby said audio output signal is provided from the second terminal to said pair of telephone lines.

9. A time-sharing communications system according to claim 3, wherein the transmitter terminal further comprises a clocking signal generator for providing a clocking signal having a predetermined frequency to produce sync pulses in the time-division multiplexed signal wherein the endings of the sync pulses occur at the predetermined frequency to define the beginning of each frame; and the subscriber terminal transmitting means comprises an inverter operatively coupled to the wideband circuit for inverting the received time-division multiplexed signal;

a ring counter/shift register circuit operatively coupled to the wideband circuit for receiving the time-division multiplexed signal, which ring counter/shift register comprises counting means for stepping one count in response to each time slot received during each frame, with the durations between steps being the durations of the time slots, and output terminals connected to the counting means, at various different combinations of which output terminals signals are provided, in response to the stepping, during the intervals while each different time slot is being received;

a first pulse circuit including a first output gate connected to a combination of the ring counter/shift register output terminals wherein a tapped-off signal is provided from the first output gate during the interval in which the first time slot of the received time-division multiplexed signal is being received, and wherein, in response to the leading edge of said tapped-off signal corresponding to the first time slot, a first pulse signal is provided from the first pulse circuit at the end of each sync pulse of the received time-division multiplexed signal; and a second pulse circuit including a second output gate connected to a combination of the ring counter/shift register output terminals wherein a tapped-off signal is provided from the second output gate during the interval in which the last time slot of the received time-division multiplexed signal is being received, and wherein, in response to the trailing edge of said tapped-off signal corresponding to the last time slot, a second pulse signal is provided from the second pulse output circuit at the end of the last received time slot of the received time-division multiplexed signal;

a modulator channel including a flip-flop and operational amplifier pair, wherein the flip-flop has a set input operatively coupled to the second pulse circuit for receiving each second pulse signal, and the operational amplified has a first input connected to the $\overline{Q}$ output of the flip-flop and to ground through a capacitor, a second input operatively coupled to a subscriber output system for providing at the second input an analog signal containing new information related to said subscriber terminal, and an output connected to the reset input of the flip-flop, wherein when a second pulse signal is received at the flip-flop set input, a pulse signal is provided at the output of the operational amplifier at an interval after the receipt of the second pulse signal at the paired flip-flop set input, wherein the duration of the interval is dependent upon the level of the analog input signal then provided at the second input of the operational amplifier, whereby the output signal from the operational amplifier resets the paired flip-flop to terminate the output signal from the operational amplifier to define the output signal from the operational amplifier as a pulse;

a transmitter flip-flop having a set input operatively coupled to the output of the operational amplifier and a reset input operatively coupled to the first pulse circuit for receiving each first pulse signal; and an OR gate having inputs operatively coupled to the output of the inverter and to the Q output of the transmitter flip-flop and an output operatively coupled to the wideband circuit;

whereby, in response to the inverted time-division multiplexed signal and the first pulse signal, the sync pulse of the time-division multiplexed signal provided to the wideband circuit from the OR gate ends at a time corresponding to the end of the first time slot of the received time-division multiplexed signal, and whereby, in response to the inverted time-division multiplexed signal, the second pulse signal, and the analog input signal then provided to the second input of the operational amplifier, a time slot containing new information related to the subscriber terminal is included in the time-division multiplexed signal provided to the wide-band circuit from the OR gate in an interval immediately following the end of the last time slot of the inverted time-division multiplexed signal.

10. A time sharing communications system according to claim 9, wherein the subscriber terminal demodulating means comprises the ring counter/shift register of the subscriber terminal transmitting means, wherein a tapped-off signal is provided from the first output gate during the interval in which the first time slot of the received time-division multiplexed signal is being received;

an integrating circuit which is operatively coupled to the first output gate for providing, in in response to the tapped-off signal corresponding to the first time slot, a signal of linearly varying amplitude during the duration of said first time slot; and a sample hold, and reset circuit which is operatively coupled to the first output gate and to the integrating circuit for providing an analog output signal corresponding to the information contained in the first time slot, by sampling the amplitude of the integrated signal from the coupled integrating circuit during said first time slot, by holding the sampled signal until the next first time slot, and by resetting for resampling upon the recurrence of each first time slot.

11. A time sharing subscriber communications system according to claim 1, wherein the subscriber terminal demodulating means comprise a ring counter/shift register operatively coupled to the wide-band circuit for receiving the time-division multiplexed signal, which ring counter/shift register comprises counting means for stepping one count in response to each time slot received during each frame, with the durations between steps being the durations of the time slots; and output terminals connected to the counting means, at various different combinations of which output terminals signals are provided, in response to the stepping, during the intervals while each different time slot is being received;

a number of output gates corresponding to the number of time slots containing information related to said subscriber terminal, each of which output gates is connected to different combinations of the ring counter/shift register output terminals, wherein a tapped-off signal is provided from a said output gate during the interval in which the corresponding time slot is being received;

one or more integrating circuits, each of which is operatively coupled to one of the output gates for providing, in response to the tapped-off signal, an integrated signal of linearly varying amplitude during the duration of the corresponding time slot being received; and one or more sample, hold, and reset circuits, each of which is operatively coupled to one of the output gates and to the integrating circuit which is coupled to the same output gate, for providing an analog output signal corresponding to the information contained in the received corresponding time slot, by sampling the amplitude of the integrated signal from the coupled integrating circuit during each corresponding time slot, by holding the sampled signal until the next corresponding time slot, and by resetting for resampling upon each recurrence of the corresponding time slot.

12. A time sharing subscriber communications system according to claim 11, wherein telephone services are provided and wherein the subscriber terminal demodulator means further comprises a band pass filter operatively coupled to the output of the sample, hold, and reset circuit for detecting and providing that portion of the analog output signal which is an audio output signal; and a DC comparator circuit operatively coupled to the output of the sample, hold, and reset circuit for detecting and providing that portion of the analog output signal which is a supervisory signal.

13. A time-sharing communications system according to claim 1, characterized by the feature that the transmitter terminal comprises a clocking signal generator for providing a clocking signal having a predetermined frequency to produce sync pulses in the time-division multiplexed signal, wherein the endings of the sync pulses occur at the predetermined frequency to define the beginning of each frame;

an OR gate;

a plurality of modulator channels operatively coupled to the clocking signal generator, each of which modulator channels is operatively coupled to a separate one of said input channels, and connected to an input of the OR gate, and each of which modulator channels includes a flip-flop and operational amplifier pair; wherein all of the modulator channels are coupled to each other in tandem for serial operation in the said predetermined order; and wherein in each modulator channel the operational amplifier has a first input which is connected to the $\overline{Q}$ output of the flip-flop and connected to ground through a capacitor, a second input which is coupled to a said input channel, and an output which is connected to the reset input of the flip-flop, and operatively coupled to the set input of the flip-flop of the next tandem coupled modulator channel of the plurality of modulator channels, and to an input of the OR gate;

wherein the flip-flop of the first modulator channel of the plurality of tandem coupled modulator channels has a set input which is operatively coupled to the clocking signal generator to receive the clocking signal, in response to which clocking signal the first modulator channel flip-flop delivers a signal to the first input of the paired operational amplifier, in response to which signal from the flip-flop the operational amplified provides an output pulse signal at an interval after the receipt of the clocking signal at the paired flip-flop set input, wherein the duration of the interval is dependent upon the level of the analog input signal then provided at the second input of the operational amplifier; and whereby the output signal from the operational amplifier resets the paired flip-flop to terminate the output signal from the operational amplifier to define the output signal from the operational amplifier as a pulse, is delivered as an indicating signal to the second modulator channel flip-flop to initiate the provision of a pulse signal from the second modulator channel, and is delivered to an input of the OR gate.

14. A time-sharing subscriber communications system according to claim 13, wherein the predetermined number of time slots exceeds the number of said input channels by a given number and wherein the transmitter terminal modulating means further comprises channel reservation means connected to tandem with the tandem connected modulator channels and between the first and last modulator channels for providing the given number of pulses to an input of the OR gate, wherein each of said given number of pulses is provided at a predetermined minimum interval following the preceding pulse delivered to an input of the OR gate, and for delivering an indicating signal to the next modulator channel of the tandem coupled modulator channels for initiating the provision of a pulse from the next modulator channel.

15. A time sharing subscriber communications system according to claim 14, wherein the channel reservation means comprise one or more channel reservation boards, of which a first channel reservation board provides a first number of pulses to an input of the OR gate, which first channel reservation board comprises a first flip-flop and operational amplifier pair, wherein the first flip-flop has a set input operatively coupled to the means which provide the next preceding pulse to an input of the OR gate, and the first operational amplifier has a first input connected to the Q output of the first flip-flop and connected to ground through a first capacitor having a selected value, a second input connected to a source of bias voltage, and an output connected to the reset input of the first flip-flop and operatively coupled to an input of the OR gate, wherein when the means for providing the next preceding pulse to an input of the OR gate so provide said next preceding pulse, the said providing means also deliver an indicating signal to the set input of the first flip-flop, in response to which delivered indicating signal a pulse signal is provided at the first operational amplifier at the predetermined minimum interval following the provision of said next previous pulse to an input of the OR gate, wherein the predetermined minimum interval is dependent upon the selected value of the first capacitor and the value of the bias voltage;

a second flip-flop and operational amplifier pair, wherein the second flip-flop has a set input operatively coupled to the first operational amplifier output, and the second operational amplifier has a first input connected to the $\overline{Q}$ output of the second flip-flop and connected to ground through a second capacitor having the selected value, a second input connected to the source of bias voltage, and an output connected to the reset input of the second flip-flop and operatively coupled to an input of the OR gate and to the set input of the first flip-flop;

a line gate operatively coupled between the second operational amplifier output and the set input of the first flip-flop; and counting means having an input operatively coupled to the outputs of the first and second operational amplifiers, a first output operatively coupled to the line gate, and a second output operatively coupled to either the set input of a modulator channel flip-flop or the set input of a first flip-flop of another like channel reservation board; wherein upon the receipt of the first pulse at the counting means input after the counting means are reset, a signal is delivered from the counting means first output to the line gate to enable output pulses to be delivered from the second operational amplifier to the set input of the first number of pulses at the counting means input after the counting means are reset, the counting means are again reset, a signal is delivered from the counting means first output to the line gate to inhibit the delivery of output pulses from the second operational amplifier output to the first flip-flop set input, and a signal is delivered from the counting means second output for indicating the delivery of the last of the first number of pulses from the first channel reservation board to an input of the OR gate.

16. A time-sharing subscriber communications system, wherein a time-division multiplexed signal, containing information related to various subscriber terminals in various time slots of each frame, is carried in a given frequency band over a single wideband circuit connected to the various subscriber terminals, which system comprises a wideband circuit for carrying signals within a wideband of frequencies including a given frequency band;

a plurality of subscriber terminals connected in series in the wideband circuit; and a transmitter terminal connected to a first given number of input channels which are sources of analog input signals and interfaced to the wideband circuit at one end of the series-connected subscriber terminals for transmitting a time-division multiplexed signal in the given frequency band, which transmitter terminal comprises a clocking signal generator for providing a clocking signal having a predetermined frequency;

a transmitting means for transmitting, in the given frequency band on the wideband circuit, a time-division multiplexed signal having a series of frames and a predetermined number of time slots in each frame, which time-division multiplexed signal contains information related to various ones of the subscriber terminals in various time slots of each frame and contains a sync pulse, the ending of which sync pulse defines the beginning of each frame, wherein the endings of the sync pulses occur in response to the clocking signal at the predetermined frequency; and a modulating means for providing the time slots in the transmitted signal and for placing in the time slots, in a predetermined order related to the series order of the subscriber terminals, information corresponding to analog input signals received from various input channels respectively related to various ones of the subscriber terminals; and each of which subscriber terminals comprises a demodulating means for tapping-off from the time-division multiplexed signal received on the wideband circuit the information contained in one or more time slots related to that subscriber terminal, and for providing one or more analog output signals respectively corresponding to the tapped-off information;

characterized by the feature that during each frame the transmitter terminal modulating means provides to the transmitter terminal transmitting means, in the predetermined order, a pulse train commencing in response to the clocking signal and containing a predetermined number of pulses, corresponding to the predetermined number of time slots wherein the pulses are spaced at intervals corresponding to the values of said received analog input signals; and wherein during each frame the transmitter terminal transmitting means transmits on the wideband circuit a signal having a voltage level which is instantaneously switched across a nominal zero axis between a nominal positive value and a nominal negative value in response to each pulse in the pulse train provided by the transmitter terminal modulating means, whereby each time slot is defined by the interval between successive said zero-axis crossings and the information contained in each time slot is defined by the duration of said each time slot.

17. A time-sharing subscriber communications system according to claim 16, wherein the subscriber terminal further comprises a transmitting means for retransmitting a portion of the time-division multiplexed signal received on the wideband circuit and for newly transmitting in one or more of the various time slots of each frame new information related to said subscriber terminal, wherein each frame of the time-division multiplexed signal transmitted from the subscriber terminal transmitting means contains the predetermined number of time slots.

18. A time-sharing subscriber communications system according to claim 17, wherein the subscriber terminal transmitting means comprise an inverter operatively coupled to the wideband circuit for inverting the received time-division multiplexed signal;

a ring counter/shift register circuit operatively coupled to the wideband circuit for receiving the time-division multiplexed signal, which ring counter/shift register comprises counting means for stepping one count in response to each time slot received during each frame, with the durations between steps being the durations of the time slots; and output terminals connected to the counting means, at various different combinations of which output terminals signals are provided, in response to the stepping, during the intervals while each different time slot is being received;

a first pulse circuit including a first output gate connected to a combination of the ring counter/shift register output terminals wherein a tapped-off signal is provided from the first output gate during the interval in which the first time slot of the received time-division multiplexed signal is being received, and wherein, in response to the leading edge of said tapped-off signal corresponding to the first time slot, a first pulse signal is provided from the first pulse circuit at the end of each sync pulse of the received time-division multiplexed signal; and a second pulse circuit including a second output gate connected to a combination of the ring counter/shift register output terminals wherein a tapped-off signal is provided from the second output gate during the interval in which the last slot of the received time-division multiplexed signal is being received, and wherein, in response to the trailing edge of said tapped-off signal corresponding to the last time slot, a second pulse signal is provided from the second pulse output circuit at the end of the last received time slot of the received time-division multiplexed signal; and a modulator channel including a flip-flop and operational amplifier pair, wherein the flip-flop has a set input operatively coupled to the second pulse circuit for receiving each second pulse signal, and the operational amplifier has a first input connected to the $\overline{Q}$ output of the flip-flop and to ground through a capacitor, a second input operatively coupled to a subscriber output system for providing at the second input an analog signal containing new information related to said subscriber terminal, and an output connected to the reset input of the flip-flop, wherein when a second pulse signal is received at the flip-flop set input, a pulse signal is provided at the output of the operational amplifier at an interval after the receipt of the second pulse signal at the paired flip-flop set input, wherein the duration of the interval is dependent upon the level of the analog input signal then provided at the second input of the operational amplifier, whereby the output signal from the operational amplifier resets the paired flip-flop to terminate the output signal from the operational amplifier to define the output signal from the operational amplifier as a pulse;

a transmitter flip-flop having a set input operatively coupled to the output of the operational amplifier and a reset input operatively coupled to the first pulse circuit for receiving each first pulse signal; and an OR gate having inputs operatively coupled to the output of the inverter and to the Q output of the transmitter flip-flop and an output operatively coupled to the wideband circuit;

whereby, in response to the inverted time-division multiplexed signal and the first pulse signal, the sync pulse of the time-division multiplexed signal provided to the wideband circuit from the OR gate ends at a time corresponding to the end of the first time slot of the received time-division multiplexed signal, and whereby, in response to the inverted time-division multiplexed signal, the second pulse signal, and the analog input signal then provided to the second input of the operational amplifier, a time slot containing new information related to the subscriber terminal is included in the time-division multiplexed signal provided to the wideband circuit from the OR gate in an interval immediately following the end of the last time slot of the inverted time-division multiplexed signal.

19. A time-sharing subscriber communications systems according to claim 18, wherein the subscriber terminal demodulating means comprise the ring counter/shift register of the subscriber terminal transmitting means, wherein a tapped-off signal is provided from the first output gate during the interval in which the first time slot of the received time-division multiplexed signal is being received;

an integrating circuit which is operatively coupled to the first output gate for providing, in response to the tapped-off signal corresponding to the first time slot, a signal of linearly varying amplitude during the duration of said first time slot; and a sample, hold, and reset circuit which is operatively coupled to the first output gate and to the integrating circuit for providing an analog output signal corresponding to the information contained in the first time slot, by sampling the amplitude of the integrated signal from the coupled integrating circuit during said first time slot, by holding the sampled signal until the next first time slot, by holding the sampled signal until the next first time slot, and by resetting for resampling upon the recurrence of each first time slot.

20. A time-sharing subscriber communications system according to claim 19, further comprising a subscriber terminal interface circuit comprising a first terminal operatively coupled to the output of the sample, hold and reset circuit for receiving the analog output signal;

a first operational amplifier having a first input coupled to the first terminal and a second input coupled to ground, wherein a signal provided at the first operational amplifier first input is inverted at the first operational amplified output;

a second terminal operatively coupled to a subscriber output system for providing at the second terminal an analog signal containing new information related to said subscriber terminal, and operatively coupled to the output of the first operational amplifier, wherein at the second terminal there appears the sum of said analog signal containing new information related to said subscriber terminal and a signal from the output of the first operational amplifier; and a second operational amplifier having a first input which is connected for additively receiving signals from the first and second terminals, a second input which is coupled to ground, and an output which is operatively coupled to the modulator channel operational amplifier second input;

whereby the analog signal containing new information related to said subscriber terminal is provided from the output of the second operational amplifier to the modulator channel operational amplifier second input; and whereby the analog output signal is provided from the second terminal to said subscriber output system.

21. A time-sharing subscriber communications system according to claim 20, wherein telephone services are provided and the subscriber output system comprises a telephone set;

wherein the subscriber terminal demodulating means further comprises a band pass filter operatively coupled to the output of the sample, hold, and reset circuit for detecting and providing that portion of the analog output signal which is an audio output signal; and a DC comparator circuit operatively coupled to the output of the sample, hold and reset circuit for detecting and providing that portion of the analog output signal which is a supervisory signal;

wherein within the subscriber terminal interface circuit the first terminal is operatively coupled to the output of the band pass filter, and the second terminal is operatively coupled by telephone lines to said telephone set;

wherein the subscriber terminal interface circuit further comprises a first switch for enabling the ringing of said telephone set, which first switch is operatively coupled to the output of the DC comparator circuit for operatively coupling a source of power for ringing said telephone set to said telephone set, and operates to enable the ringing of said telephone set upon the receipt of a supervisory signal indicating a ringing function from the DC comparator circuit; and a second switch operatively coupled by said telephone lines to said telephone set and responsive to the provision of an off-hook signal from said telephone set for providing a supervisory signal indicating an off-hook condition, and for breaking the operative coupling between the DC comparator circuit and the first switch to prevent enabling of further ringing of said telephone set, and in response to the receipt of a dialing signal from said telephone set, the second switch provides a a supervisory signal indicating a dialing signal; and wherein the subscriber terminal transmitting means comprises a first voltage translator circuit operatively coupled to the output of the second operational amplifier and to the second input of the modulator channel operational amplifier for providing to the second input of the modulator channel operational amplifier an audio signal portion of said analog signal containing new information related to said subscriber terminal; and a second voltage translator circuit operatively coupled to the second switch and to the second input of the modulator channel operational amplifier for providing to the second input of the modulator channel operational amplifier a supervisory signal portion of said analog signal containing new information related to said subscriber terminal.

22. A time-sharing subscriber communications system according to claim 16, wherein the transmitter terminal modulating means comprises an OR gate having its output operatively coupled to the transmitter terminal transmitting means;

a plurality of modulator channels operatively coupled to the clocking signal generator, each of which modulator channels is operatively coupled to a separate said input channel, and connected to an input of the OR gate, and each of which modulator channels includes a flip-flop and operational amplifier pair; wherein all of the modulator channels are coupled to each other in tandem for serial operation in a predetermined order related to the series order of the subscriber terminals; and wherein in each modulator channel the operational amplifier has a first input which is connected to the Q output of the flip-flop and connected to ground through a capacitor, a second input which is coupled to said input channel respectively related to said subscriber terminal, and an output which is connected to the reset input of the flip-flop, and operatively coupled to the set input of the flip-flop of the next tandem coupled modulator channel of the plurality of modulator channels, and to an input of the OR gate;

wherein the flip-flop of the first modulator channel of the plurality of tandem coupled modulator channels has a set input which is operatively coupled to the clocking signal generator to receive the clocking signal, in response to which clocking signal the first modulator channel flip-flop delivers a signal to the first input of the paired operational amplifier, in response to which signal from the flip-flop the operational amplifier provides an output pulse signal at an interval after the receipt of the clocking signal at the paired flip-flop set input, wherein the duration of the interval is dependent upon the level of the analog input signal then provided at the second input of the operational amplifier;

whereby the output signal from the operational amplifier resets the paired flip-flop to terminate the output signal from the operational amplifier to define the output signal from the operational amplifier as a pulse, is delivered as an indicating signal to the second modulator channel flip-flop to initiate the provision of a pulse signal from the second modulator channel, and is delivered to an input of the OR gate; and whereby, in response to the pulses delivered to the inputs of the OR gate, a pulse train is provided from the OR gate output to the transmitter terminal transmitting means.

23. A time-sharing subscriber communications system according to claim 22, wherein the transmitter terminal transmitting means comprises a pulse train generating flip-flop having a reset input operatively coupled to the clocking signal generator, having a toggle input operatively coupled to the output of the OR gate, having its set input operatively coupled to the output of the operational amplifier of the last tandem coupled modulator channel of the plurality of modulator channels, and having Q and/or $\overline{Q}$ outputs operatively coupled to the wideband circuit, wherein the pulse train generating flip-flop is reset in response to the clocking signal at the predetermined frequency and provides the time-division multiplexed signal at the Q and/or $\overline{Q}$ outputs wherein each sync pulse ends upon the pulse train generating flip-flop being reset and wherein the time slots are produced in response to the train of pulses provided to the toggle input terminal from the OR gate, and wherein, when the operational amplifier of the last tandem coupled modulator channel provides an output signal to the OR gate, an indicating signal is delivered from the last tandem coupled modulator channel operational amplifier output to the set input of the pulse train generating flip-flop, to provide the beginning of the next sync pulse of the time-division multiplexed signal provided at the Q and/or $\overline{Q}$ outputs of the pulse train generating flip-flop.

24. A time-sharing subscriber communications system wherein a time-division multiplexed signal, containing information related to various subscriber terminals in various time slots of each frame, is carried in a low frequency band over a single wideband circuit connected to the various subscriber terminals, and wherein the wideband circuit is connected to a television signal source for carrying television services in one or more high frequency bands, which system comprises a wideband circuit;

a plurality of subscriber terminals connected in series in the wideband circuit; and a transmitter terminal connected to a first given number of input channels which are sources of analog input signals and interfaced to the wideband circuit, at one end of the series-connected subscriber terminals, for transmitting in the low frequency band a time-division multiplexed signal having a series of frames and a predetermined number of time slots in each frame, which transmitter terminal comprises a modulating means for modulating the transmitted signal to provide a transmitted time-division multiplexed signal containing time slots and for placing in the time slots in a predetermined order related to the series order of the subscriber terminals information corresponding to analog input signals received from various input channels respectively related to various ones of the subscriber terminals; and each of which subscriber terminals comprises a demodulating means for tapping off from the time-division multiplexed signal received on the wideband circuit the information contained in one or more time slots related to that subscriber terminal, and for providing one or more analog output signals respectively corresponding to the tapped-off information characterized by the feature that during each frame the transmitter terminal modulating means provides, in the predetermined order, a predetermined number of pulses corresponding to the predetermined number of time slots, wherein the pulses are spaced at intervals corresponding to the values of said received analog input signals, and instantaneously switches the voltage level of the time-division multiplexed signal transmitted on the wideband circuit across a nominal zero axis between a nominal positive value and a nominal negative value in response to each provided pulse, whereby each time slot is defined by the interval between successive said zero-axis crossings and the information contained in each time slot is defined by the duration of said each time slot.

25. A time-sharing subscriber communications system wherein a time-division multiplexed signal, containing information related to various subscriber terminals in various time slots of each frame, is carried in a given frequency band over a single wideband circuit connected to the various subscriber terminals, which system comprises a wideband circuit for carrying signals within a wideband of frequencies including a given frequency band;

a plurality of subscriber terminals connected in series in the wideband circuit; and a transmitter terminal connected to a first given number of input channels which are sources of analog input signals and interfaced to the wideband circuit at one end of the series-connected subscriber terminals, for transmitting in the given frequency band, a time-division multiplexed signal having a series of frames and a predetermined number of time slots in each frame, which transmitter terminal comprises a modulating means for modulating the transmitted signal to provide a transmitted time-division multiplexed signal containing time slots and for placing in the time slots, in a predetermined order related to the series order of the subscriber terminals, information corresponding to analog input signals received from various input channels respectively related to various ones of the subscriber terminals; and each of which subscriber terminals comprises a demodulating means for tapping off from the time-division multiplexed signal received on the wideband circuit the information contained in the one or more time slots related to that subscriber terminal, and for providing one or more analog output signals respectively corresponding to the tapped-off information;

characterized by the feature that during each frame the transmitter terminal modulating means provides, in the predetermined order, a signal defining the predetermined number of time slots, wherein said defining signal is provided in response to the values of said received analog input signals, and wherein during each frame the voltage level of the time-division multiplexed signal transmitted on the wideband circuit is instantaneously switched across the nominal zero axis between a nominal positive value and a nominal negative value in response to said defining signal provided by the transmitter terminal modulating means, wherein each time slot is defined by the interval between a zero-axis crossing and the preceding zero-axis crossing and the information contained in each time slot is defined by the duration of said each time slot.

26. A transmitter terminal for transmitting a time-division multiplexed signal having a series of frames and a predetermined number of time slots in each frame, which transmitter terminal comprises a modulating means for modulating the transmitted signal by placing in the time slots in a predetermined order information corresponding to analog input signals from a given number of input channels by providing in the predetermined order a number of pulses corresponding to the predetermined number of time slots and spaced at intervals related to the values of said received analog input signals, characterized by the feature that during each frame the modulating means instantaneously switches the voltage level of the time-division multiplexed signal across a nominal zero axis between a nominal positive value and a nominal negative value in response to each said provided pulse;

whereby each time slot is defined by the interval between successive said zero-axis crossings.

27. A transmitter terminal according to claim 26, characterized by a clocking signal generator for providing a clocking signal having a predetermined frequency to produce sync pulses in the time-division multiplexed signal, wherein the endings of the sync pulses occur at the predetermined frequency to define the beginning of each frame;

and OR gate;

a plurality of modulator channels operatively coupled to the clocking signal generator, each of which modulator channels is operatively coupled to a separate one of said input channels, and connected to an input of the OR gate, and each of which modulator channels includes a flip-flop and operational amplifier pair; wherein all of the modulator channels are coupled to each other in tandem for serial operation in the said predetermined order; and wherein in each modulator channel the operational amplifier has a first input which is connected to the $\overline{Q}$ output of the flip-flop and connected to ground through a capacitor, a second input which is coupled to a said input channel, and an output which is connected to the reset input of the flip-flop, and operatively coupled to the set input of the flip-flop of the next tandem coupled modulator channel of the plurality of modulator channels, and to an input of the OR gate;

wherein the flip-flop of the first modulator channel of the plurality of tandem coupled modulator channels has a set input which is operatively coupled to the clocking signal generator to receive the clocking signal, in response to which clocking signal the first modulator channel flip-flop delivers a signal to the first input of the paired operational amplifier, in response to which signal from the flip-flop the operational amplifier provides an output pulse signal at an interval after the receipt of the clocking signal at the paired flip-flop set input, wherein the duration of the interval is dependent upon the level of the analog input signal then provided at the second input of the operational amplifier; and whereby the output signal from the operational amplifier resets the paired flip-flop to terminate the output signal from the operational amplifier to define the output signal from the operational amplifier as a pulse, is delivered as an indicating signal to the second modulator channel flip-flop to initiate the provision of a pulse signal from the second modulator channel, and is delivered to an input of the OR gate.

* * * * *

UNITED STATES PATENT OFFICE
CERTIFICATE OF CORRECTION

Patent No. 3,647,976 Dated March 7, 1972

Inventor(s) Donald W. Moses

It is certified that error appears in the above-identified patent and that said Letters Patent are hereby corrected as shown below:

Column 9, line 48, after "26" insert -- is --.

Column 10, line 6, delete "to" and in its place insert -- on the --.

Column 11, line 20, after "shown in the" insert -- block --; and line 25, change "hole" to -- hold --.

Column 12, line 6, after "When" insert -- a --;

line 30, change "247" to -- 274 --; and line 37, after "at" insert -- the terminal --.

Column 13, line 55, change "ps" to -- is --.

Column 15, line 34, change "Q" to -- $\overline{Q}$ --.

Column 16, line 5, change "gage" to -- gate --;

line 9, change "gage" to -- gate --;

line 24, change "use" to -- used --; and line 41, after "pearing" insert -- at the --.

(continued)

FORM PO-1050 (10-69)

USCOMM-DC 60376-P69
☆ U.S. GOVERNMENT PRINTING OFFICE : 1969 O—366-334

(cont.)

UNITED STATES PATENT OFFICE
CERTIFICATE OF CORRECTION

Patent No. 3,647,976 Dated March 7, 1972

PAGE - 2

Inventor(s) Donald W. Moses

It is certified that error appears in the above-identified patent and that said Letters Patent are hereby corrected as shown below:

Column 17, line 36, after "3" delete "a8".

Column 23, line 69, change "3" to -- 2 --.

Column 24, line 40, change "amplified" to -- amplifier --

Column 25, line 16, delete "in" (first occurrence).

Column 27, line 44, after "first" insert -- flip-flop, and wherein, upon the receipt of the first --.

Column 29, line 12, after "last" insert -- time --.

Column 31, line 40, change "Q" to -- $\overline{Q}$ --.

Column 34, line 18, change "and" to -- an --.

Signed and sealed this 22nd day of August 1972.

(SEAL)
Attest:

EDWARD M.FLETCHER,JR.
Attesting Officer

ROBERT GOTTSCHALK
Commissioner of Patents